US011517988B2

(12) United States Patent
Sheldon

(10) Patent No.: US 11,517,988 B2
(45) Date of Patent: Dec. 6, 2022

(54) METHOD AND APPARATUS FOR PREPARING MORTISE CUTS WITH A PANTOGRAPH ROUTER

(71) Applicant: WoodCraft Solutions LLC, Oregon City, OR (US)

(72) Inventor: Dwight Sheldon, Oregon City, OR (US)

(73) Assignee: Woodcraft Solutions LLC, Oregon City, OR (US)

( * ) Notice: Subject to any disclaimer, the term of this patent is extended or adjusted under 35 U.S.C. 154(b) by 322 days.

(21) Appl. No.: 15/929,301

(22) Filed: Apr. 23, 2020

(65) Prior Publication Data

US 2021/0331280 A1    Oct. 28, 2021

(51) Int. Cl.
B23Q 3/00    (2006.01)
B27F 5/02    (2006.01)
B27C 5/10    (2006.01)

(52) U.S. Cl.
CPC ............ B23Q 3/007 (2013.01); B23Q 3/002 (2013.01); B27C 5/10 (2013.01); B27F 5/02 (2013.01); *B23Q 2735/004* (2013.01)

(58) Field of Classification Search
CPC ...... B27F 1/00; B27F 1/02; B27F 1/04; B27F 1/08; B27F 1/10; B27F 1/12; B27F 1/14; B27F 1/16; B27F 5/00; B27F 5/02; B27F 5/12; B27C 5/00; B27C 5/003; B23Q 33/00; B23Q 35/00; B23Q 35/005; B23Q 35/02; B23Q 35/04; B23Q 35/08; B23Q 35/10; B23Q 35/42; B23Q 35/44; B23Q 35/46
See application file for complete search history.

(56) References Cited

U.S. PATENT DOCUMENTS

| | | | |
|---|---|---|---|
| 2,838,838 A * | 6/1958 | Lica | B23Q 35/44 144/144.1 |
| 4,561,478 A | 12/1985 | Fields | |
| 4,733,997 A | 3/1988 | Ford et al. | |
| 5,494,089 A | 2/1996 | Lubbe | |

(Continued)

OTHER PUBLICATIONS

Matthias Wandel, How the pantorouter works, posted at youtube.com, published Dec. 12, 2010, © Standard YouTube License, [online], [site visited Aug. 1, 2017], 67 pages, available from Internet, <URL:https://www.youtube.com/watch?v=8wZ1v4PIsYI>.

(Continued)

*Primary Examiner* — Matthew Katcoff
(74) *Attorney, Agent, or Firm* — Howard Russell

(57) ABSTRACT

Guide bearing stop for use in a template-guided system for routers, and more particularly to a device, system, and method, for facilitating efficient, easily repeatable, highly accurate router mortise cuts on workpieces using a pantograph-type router system. The guide bearing stop may be used with a readily adjustable template holder for holding a guide bearing stop to direct the mortise cut in a very exact manner, which is also readily adjustable and easily positioned and centered on the template holder. The guide bearing stop when used in conjunction with the router system allows for the rapid centering and rapid reproduction of varying sizes of exactly-sized and exactly-shaped mortise cuts across a variety of different workpieces.

20 Claims, 20 Drawing Sheets

(56) References Cited

U.S. PATENT DOCUMENTS

| | | | |
|---|---|---|---|
| 6,557,601 B1* | 5/2003 | Taylor | B27B 27/10 |
| | | | 83/435.14 |
| 6,736,173 B1 | 5/2004 | Grisley et al. | |
| 6,845,699 B1 | 1/2005 | Anton | |
| 10,639,754 B2 | 5/2020 | Sheldon et al. | |
| 2004/0022595 A1 | 2/2004 | Owen | |
| 2005/0236069 A1 | 10/2005 | O'Brien | |
| 2006/0021676 A1 | 2/2006 | McDaniel et al. | |
| 2008/0210338 A1* | 9/2008 | Ponce | B23Q 9/0042 |
| | | | 144/144.51 |
| 2009/0290949 A1 | 11/2009 | Steger | |

OTHER PUBLICATIONS

Matthias Wandel, The Pantorouter, posted at woodgears.ca, [online], [site visited Aug. 2, 2017], 5 pages, available from Internet, <URL:https://woodgears.ca/pantorouter/>.

Humwer, Templates, posted at humwer.com, © humwer Inh. Werner Hummel—2015, [online], [site visited Aug. 2, 2017], 3 pages, available from Internet, <URL:http://www.humwer.com/en/Templates/>.

Dwight Sheldon, predecessor template with very minimal outer tapering only sold by applicant in 2015, photograph, 1 page.

Dwight Sheldon, predecessor template holder sold by applicant in 2015, photograph, 1 page.

Guidozelf, Templates for Tenons & Mortises for Pantorouter (Woodworking router accessory), Aug. 1, 2015, https://www.thingiverse.com/thing:951634 (Year: 2015).

Pantorouter, Butterfly Mortise and tenon joint by Hybrid Pantorouter, Sep. 4, 2016, https://www.youtube.com/watch?v=5yGoiqCLTk8 (Year: 2016).

Pantorouter, making large mortise and tenon by hybrid pantorouter, Jun. 7, 2013, https://www.youtube.com/watch?v=-QxgrukqFGc (Year: 2013).

* cited by examiner

METHOD AND APPARATUS FOR PREPARING MORTISE CUTS WITH A PANTOGRAPH ROUTER

CONTINUITY AND CLAIM OF PRIORITY

This is an original U.S. patent application.

FIELD

The present invention relates to using devices, systems, and methods, with template-guided systems for routers for facilitating joinery cuts on workpieces, and more particularly to stop-type devices, systems, and methods, adapted for use with adjustable template holders and templates of pantograph-type router systems to facilitate efficient and accurate cutting of a large number of varied-length mortise-type joinery cuts in workpieces.

BACKGROUND

In the art of woodworking, and especially in furniture production, it is necessary to make mortise and tenon cuts into wood to allow the various parts of an item of furniture to be fit together. A female cut, which is cut out of the base piece, is referred to as a mortise cut, and it serves as a receptacle for a corresponding tenon cut, which is a male cut that inserts into the female mortise cut, facilitating holding of the item of furniture together, often together with the use of wood glue. In order to produce a high-quality piece of furniture, it is necessary to produce very exact mortise and tenon cuts which closely correspond to each other in size and shape, to avoid unnecessary motion among the various pieces in the furniture, to give the final product a sturdy construction. Inexact cuts result in low-quality pieces of furniture which are wobbly and unmarketable.

Mortise cuts may be produced using a number of different tools such as drills, routers, mortisers, mortising attachments for drill presses, mortising chisels, etc., to bore out the cut. However, with some of these tools, and especially with any handheld tool, it has been exceedingly difficult to produce mortise cuts which are consistently the same size and shape. With other tools, such as a drill press with a mortising attachment, while it has been easier to produce mortise cuts of the same size and shape, changing the configuration of such a machine to produce such cuts across a variety of workpieces has involved a time-consuming process. Similarly, changing the configuration of such a machine to produce mortise cuts of a different size or shape, also has involved a time-consuming process which has required exact alignment of the workpiece, careful movement of the machine, and repeated time-consuming measurements to re-center the workpiece and cutting bit.

Thus, there has developed a need in the wood working industry for an improved tool which has allowed for the rapid production of highly exact mortise cuts across different items of furniture, as well as for the production of different shapes and size mortise cuts.

A PantoRouter™ shown in FIG. 1 (otherwise known as a pantograph, or pantograph-type router system), and other router systems, have used a router to make cuts in wood, plastic and soft metals. The cutting bit 52 for such a router typically spins at up to 24,000 RPM and has involved the use of conventional, manually operated, methods and commonly available jigs and templates. Pantograph-type router systems comprise a guide bearing that is adapted to follow along a template, and the position of such a guide bearing has also been adjustable to varying depths relative to a tapered template to affect the positioning of the guide bearing relative to the template used to create, for example mortise and tenon, joints for joining wood members together as described in pending U.S. patent application Ser. No. 15/650,794 for Tapered Template Guided System for a Router, Ser. No. 16/729,299 for Template Guidance System for a Router, Ser. No. 16/729,300 for Template Guidance System for a Router, and Ser. No. 16/813,460 for Positioning and Centering Device, System, and Method for Use with a Template Guidance System for a Pantograph Router, each application by the Applicant, and each of which is incorporated by reference herein.

Despite the improvements represented by using tapered templates as otherwise described in these previous related applications, the centering of differently-sized templates on a template holder to enable cutting of varied sizes of mortises has still been somewhat time-consuming, and it has required a certain amount of trial and error, both to adjust the positioning of the guide bearing relative to the template, but also to position successive templates and center successive workpieces. The enhanced efficiency of centering of workpieces, and of centering router cutting bits relative to workpieces, was addressed specifically in pending U.S. patent application Ser. No. 16/813,460 for Positioning and Centering Device, System, and Method for Use with a Template Guidance System for a Pantograph Router, by the Applicant and incorporated by reference herein, and while certain efficiency in creating differently-sized joinery cuts was discussed in that application, there has still been needed a more efficient device, system and method of cutting different-length mortises.

Thus, a common method of alignment of a workpiece on a mount or table has been to measure the thickness of the workpiece using a scale or caliper, after which the user, or operator, has moved the router or mount to center the desired joint or shape on the workpiece. A common method of fitting the joint has been to cut the mortise first then to have adjusted the size of the tenon for the proper fit. This common method has required trial and error to find the desired fit each time a similar joint has been cut.

Also, a prior method of aligning a template, or templates, so that they have been centered on a template holder, has involved a more time-consuming effort of attempting to center the template, or templates, on the template holder using a ruler and a straight-edge combined to assure that the template is located in the horizontal center of the template holder in order to facilitate greater uniformity of cuts and carves.

With these common methods, there have often been required more manual measuring, multiple test cuts, and fine-tuning before a cut has been accurately centered. Of course, a downside of such a system has been wasted material, more time-consuming measuring, uncertainty in the process of cutting, and this has also resulted in a final product that has frequently not been as precise as would otherwise have been desirable. This in turn has led to woodworking joints that have not been as durable and have not been as accurately-fitting as would otherwise have been desirable.

To attain the same level of precision quality joinery as the devices, systems, and methods of the present disclosure facilitating cutting of varied-size mortises would have taken longer for set-up and multiple test cuts per earlier methods for each new length of mortise, despite the significant advances taught in the aforementioned patent applications of the Applicant.

And this problem has been exacerbated, for example in the case of a production facility, where users have been required in the past to cut many mortise and tenon joints for many workpieces, even when using the same cutting bit to create varied-length mortises, again despite the teachings of the Applicant's aforementioned pending patent applications. This has been because, in the past, users have had to use more trial and error to re-position the cutting system relative to each new workpiece, or to make another same, or similar, cut on a newly positioned workpiece, regardless whether the same cutting bit has been used or not.

And though one such trial-and-error methods disclosed in prior co-pending patent applications of the Applicant involve the use of tapered templates, and even index marks on such tapered templates in order to know better where to locate the guide bearing on the template, these still have not provided the more efficient devices, systems, and methods of the present disclosure for creating different-length mortises.

SUMMARY

The devices, systems, and methods shown, described, and claimed herein address the problems of prior art pantograph-type router template systems, and they contribute to a more accurate, efficient, repeatable, pleasing appearance, and faster cuts on workpieces, especially for varied-length mortise cuts on workpieces, not to mention the fact that such systems provide a safer operating environment for operators. Thus, the devices of the present disclosure are preferably used with a pantographic-type router mount with a 2:1 mechanical advantage for the router, and this mechanical advantage gives the operator control and precision superior to any other manually controlled means of operation.

In accordance with an aspect of the invention, there is provided a guide bearing stop adapted for adjustable attachment adjacent a template on a template holder, wherein the guide bearing stops are mounted on a moveable template holder system, or armature, mounted on a moveable or stationary carriage, and wherein the guide bearing, for following the template, is located on a pantographic mount.

In accordance with a first embodiment of this aspect of the invention, there is provided a guide bearing stop adapted for adjustable attachment adjacent a template on a template holder, the template holder having measuring and locating indicia thereon for gauging positioning of the template for a pantograph-type router system having a guide bearing on a shaft and a cutting bit, the stop being adapted for use in setting a limit of travel of the guide bearing in at least one direction of engagement along the template to limit the travel of the cutting bit relative to a workpiece. The guide bearing stop can be moved along the template, beginning at a first guide bearing stop and ending at a second guide bearing stop to produce a mortise cut of exact size and shape.

Thus, in accordance with a first embodiment of the disclosure in accordance with this aspect, there is provided a guide bearing stop to produce a mortise cut of exact size and shape comprising: a frame member comprising a stop portion adapted for limiting travel of the guide bearing, with the frame member defining at least one hole adapted for receiving a releasable fastener for adjustably fastening the stop to at least one of (or alternatively both) the template holder and the template. The frame member further comprises cutting bit-related indicia thereon adapted for enabling accurate positioning of the stop portion of the frame member relative to the measuring indicia of the template holder adapted to limit travel of the cutting bit while the guide bearing is being manipulated along the template up to the stop portion according to a user selected cutting bit size and desired cut extent.

Also in accordance with a first embodiment of the disclosure, the frame member may be arched so as to be adapted for attachment to the template holder over a template, and may contain a plurality of interior slots adapted for being positioned adjacent portions of the template such that the stop straddles portions of the template. The plurality of interior slots may be adapted to fit on top of the template. Further, the frame member may define a plurality of holes adapted for receiving releasable fasteners for adjustably fastening the stop to at least one of the template holder and the template.

The frame member may comprise an inner stop edge and a cutting bit-related indicia edge normal to the inner stop edge, and wherein the stop portion of the frame member comprises a semi-circular void defined on the inner stop edge. The cutting bit-related indicia may be useful for allowing the guide bearing stop to be used with cutting bits of various size without requiring a different guide bearing stop for each different sized drill bit. The cutting bit-related indicia may have a plurality of cutting bit sizes having corresponding pointers adapted for pointing to measurement locations along the measuring indicia on the template holder, adapted for easily setting a position of the stop according to a chosen cutting bit size and desired cut extent.

The guide bearing stop may further comprise a stop portion which halts the motion of the guide bearing pin, and may be adapted for engaging the shaft of the guide bearing and wherein the frame member defines a void allowing clearance of the guide bearing between the frame member and the template. Further, the stop may be adapted for quick adjustment relative to a template to enable accurate positioning and cutting of different sized mortises using the same template.

In accordance with an alternative embodiment of the disclosure, there may be a plurality of guide bearing stops adapted for adjustable attachment adjacent a template on a template holder, the template holder having measuring and locating indicia thereon for gauging positioning of the template for a pantograph-type router system having a guide bearing on a shaft and a cutting bit, the stops being adapted for use in setting a limit of travel of the guide bearing in at least two directions of engagement along the template to limit the travel of the cutting bit relative to a workpiece.

Thus, in accordance with an alternative embodiment of the disclosure in accordance with this aspect, there is provided a set of guide bearing stops to produce a mortise cut of exact size and shape, each stop comprising: a frame member having a stop portion adapted for limiting travel of the guide bearing; each frame member defining at least one hole adapted for receiving a releasable fastener for adjustably fastening the stop to at least one of the template holder and the template; each frame member further comprising cutting bit-related indicia thereon adapted for enabling accurate positioning of the stop portion of each frame member relative to the measuring indicia of the template holder adapted to limit travel of the cutting bit while the guide bearing is being manipulated along the template up to the stop portion according to a user selected cutting bit size and desired cut extent. Each guide bearing stop of the set may comprise all of the features and details set forth above which may be included in the first embodiment of the disclosure.

The guide bearing stops in accordance with this aspect of the disclosure are preferably designed so that the stop portion and inner edge of each guide bearing stop is designed to align with an inner slot, or track, of a mortise guide template mounted on a template holder, and wherein with a plurality of such stops there are comprised, when installed, inner opposing stop portions and opposing inner edges of respective stops (e.g., a pair of stops) preferably with each stop positioned on the template holder so as to each be equidistantly located from a center line of the template holder. Thus, the distance between such devices when installed comprises a distance bisected by the centerline of the template holder and which distance comprises two times the desired length (in the x-direction as described in prior patent applications of the Applicant) of the desired mortise cut when using a 2:1 ratio pantograph-type router system.

The guide bearing stops in accordance with this aspect of the disclosure on the pantographic mount are precisely calculated but approximately double the desired cut so that any imperfection in the template is translated only half-scale to the workpiece, and router control requires less (approximately half) the effort, which as described further below is safer and more accurate. Thus, not only are imperfections in a template minimized to the degree of 2:1 in the final product of the workpiece, but the 2:1 mechanical advantage in the pantograph system further facilitates the ease and safety with which an operator can perform cutting and carving operations using such a system. This is in part because, in fact, there is even a greater mechanical advantage than 2:1 that is achieved with a pantograph-type router system comparing the operator handle relative to the cutting blade output. Thus, the guide bearing stops provided in accordance with this aspect of the disclosure serve to facilitate the ease, accuracy and increased safety of routing operations with their use in connection with a pantograph-type router system.

In accordance with an alternative aspect and embodiment of the disclosure, there is provided a method of setting adjustable stop locations for a cutting bit relative to a workpiece adapted for cutting differently-sized mortises using a template-guided pantograph-type router system having a cutting bit, a guide bearing, a template holder with measuring and locating indicia thereon, and a guide template. The method comprises the steps of: determining the length, width/thickness, and depth of the desired mortise cut; selecting, centering, and securing a workpiece relative to the router system; selecting and installing an appropriately-sized cutting bit to cut a desired thickness mortise; selecting and installing a guide template having a mortise cutting portion that is approximately twice the length of a largest-length desired mortise cut and that corresponds to the desired thickness of the mortise; and installing a plurality of stops by aligning bit size-related indicia on each of the stops with indicia on the template holder template for enabling reducing of mortise length constraints by enabling stopping of the cutting bit according to the selected bit size and a desired mortise length shorter than the possible largest-length mortise for the chosen template.

Also in accordance with aspects of this embodiment of the disclosure, the pantograph-type router may further comprise: a plunge handle for manipulating the router system in a z-axis direction relative to a workpiece, a z-axis depth stop, and an operating handle for manipulating the guide bearing and the cutting bit in the x-axis and y-axis directions. Further, the method may further comprise the steps of: determining a desired mortise depth and setting the corresponding z-axis plunge depth stop of the pantograph-type router; using the operating handle for placing the guide bearing within template confines for cutting the mortise; starting the router system to operate the cutting bit; using the plunge handle for plunging the router system along the z-axis direction to the desired depth of the mortise cut; and moving the guide bit within the template confines along x-axis and y-axis directions and within the reduced mortise length constraints as limited by the plurality of stops.

The subject matter of the present disclosure is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTIONS OF DRAWINGS

Figure 14:
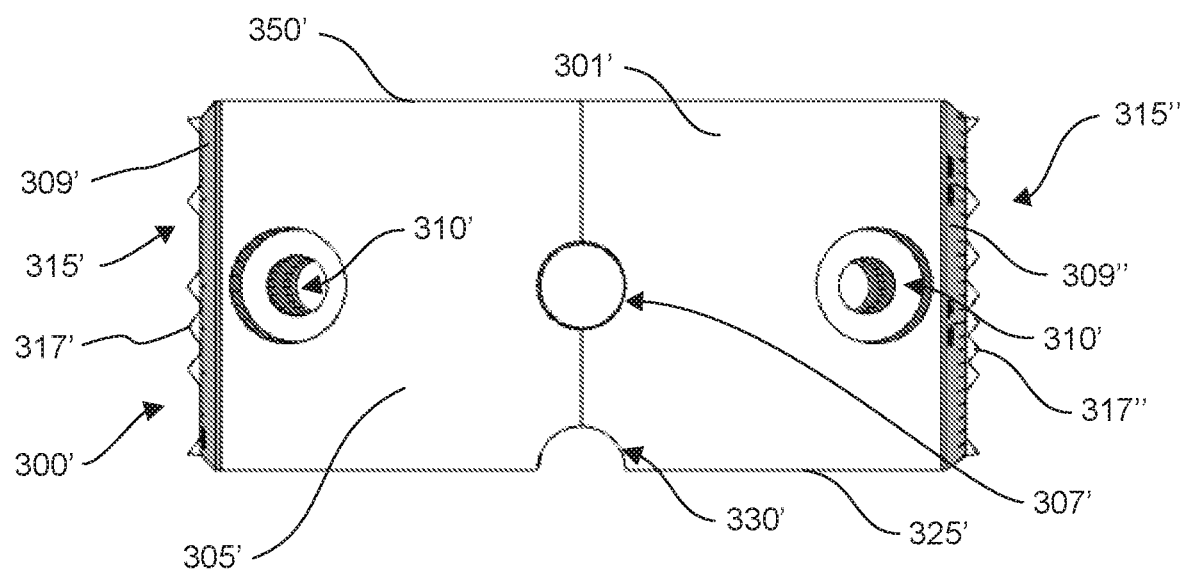
FIG. 14 is a top perspective view of an alternative embodiment guide bearing stop adapted for allowing easier use having greater visibility of cutting bit size indicia and having both standard (inches) and metric cutting bit size indicia.
Figure 15:
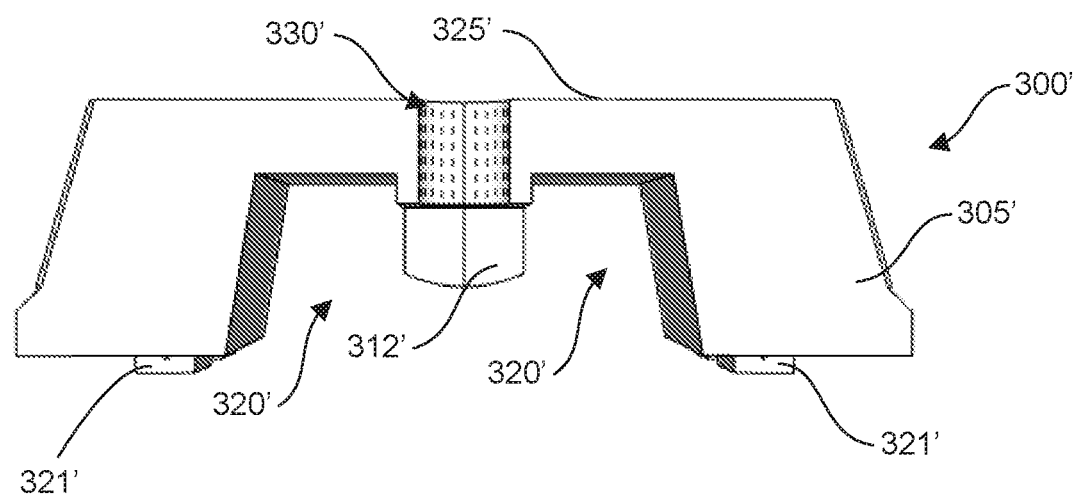
FIG. 15 is a front perspective view of the alternative embodiment guide bearing stop of FIG. 14.
Figure 16:
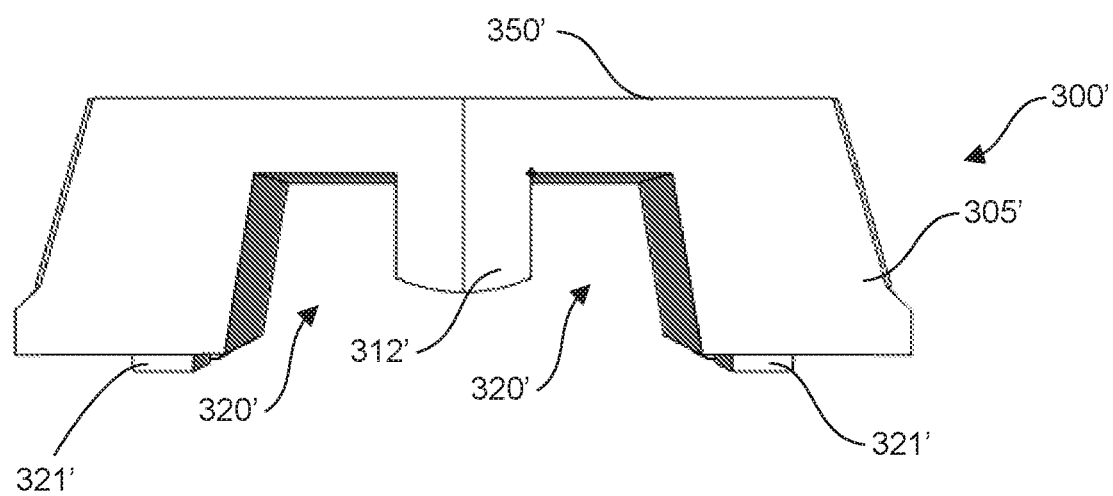
FIG. 16 is a rear perspective view of the alternative embodiment guide bearing stop of FIG. 14.
Figure 17A:
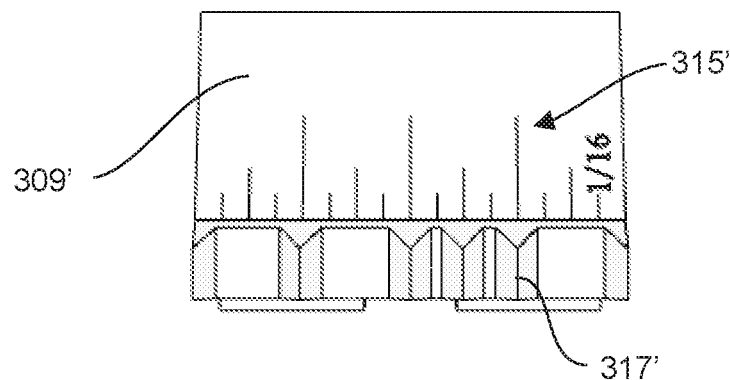
FIGS. 17A and 17B are left side and right side views of standard (inches) cutting bit size indicia and metric cutting bit size indicia, respectively, of the alternative embodiment guide bearing stop of FIG. 14.
Figure 17B:
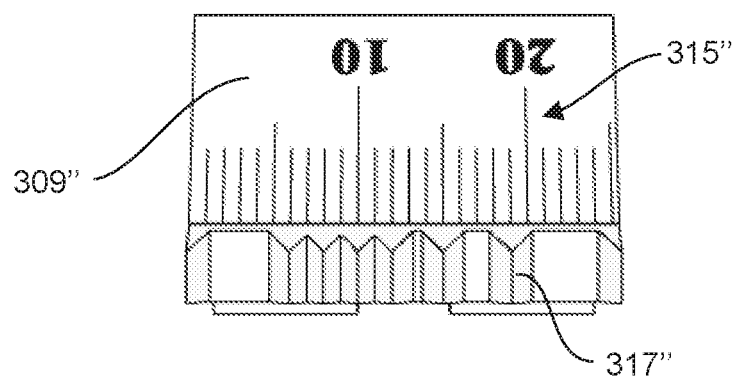
Figure 18:
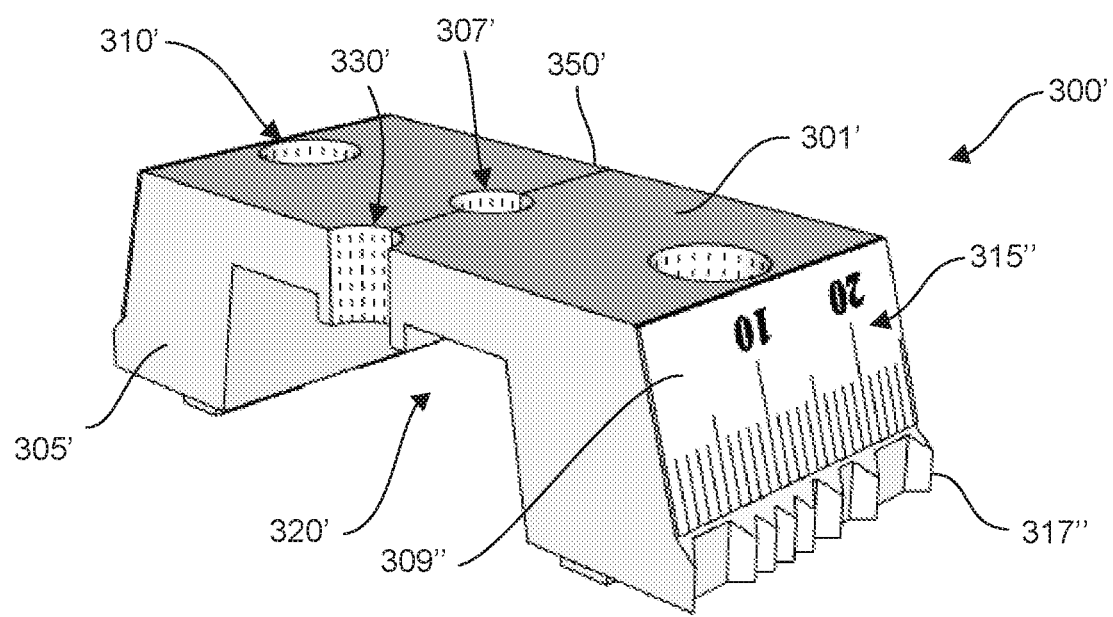
FIG. 18 is a perspective view of the alternative embodiment guide bearing stop of FIG. 14 showing the metric cutting bit size indicia thereon.
Figure 19:
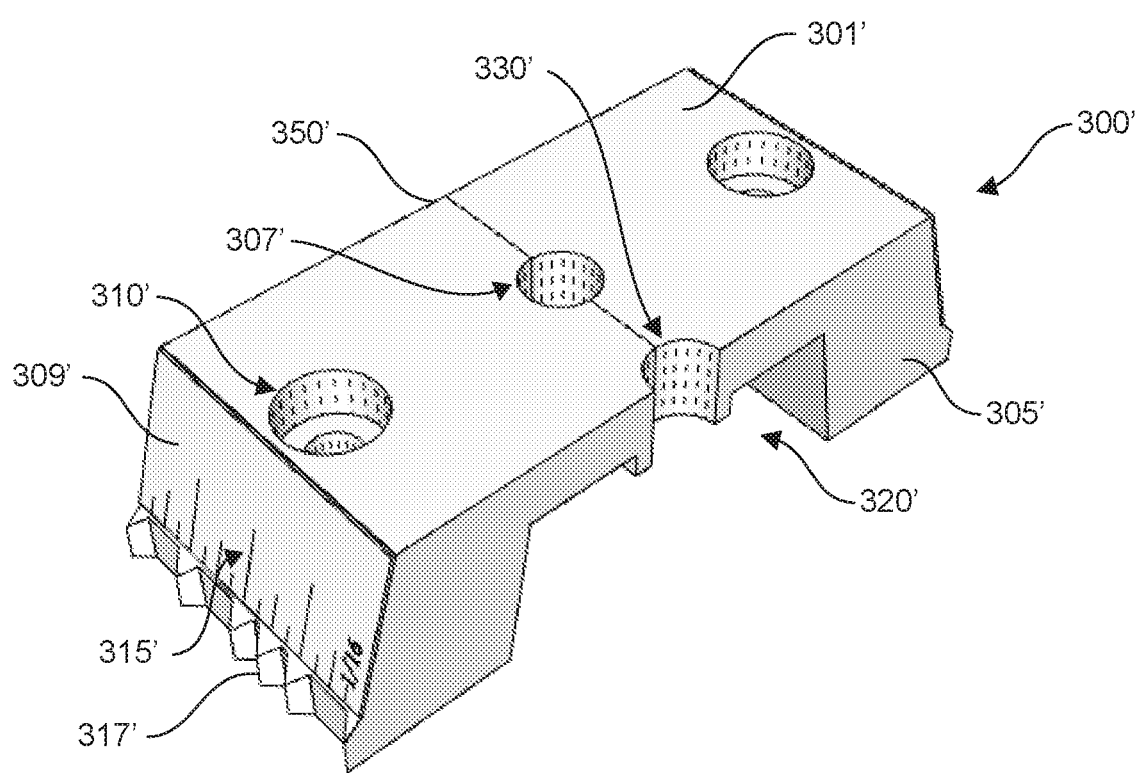
FIG. 19 is a perspective view of the alternative embodiment guide bearing stop of FIG. 14 and showing the standard (inches) cutting bit size indicia thereon.
Figure 20:
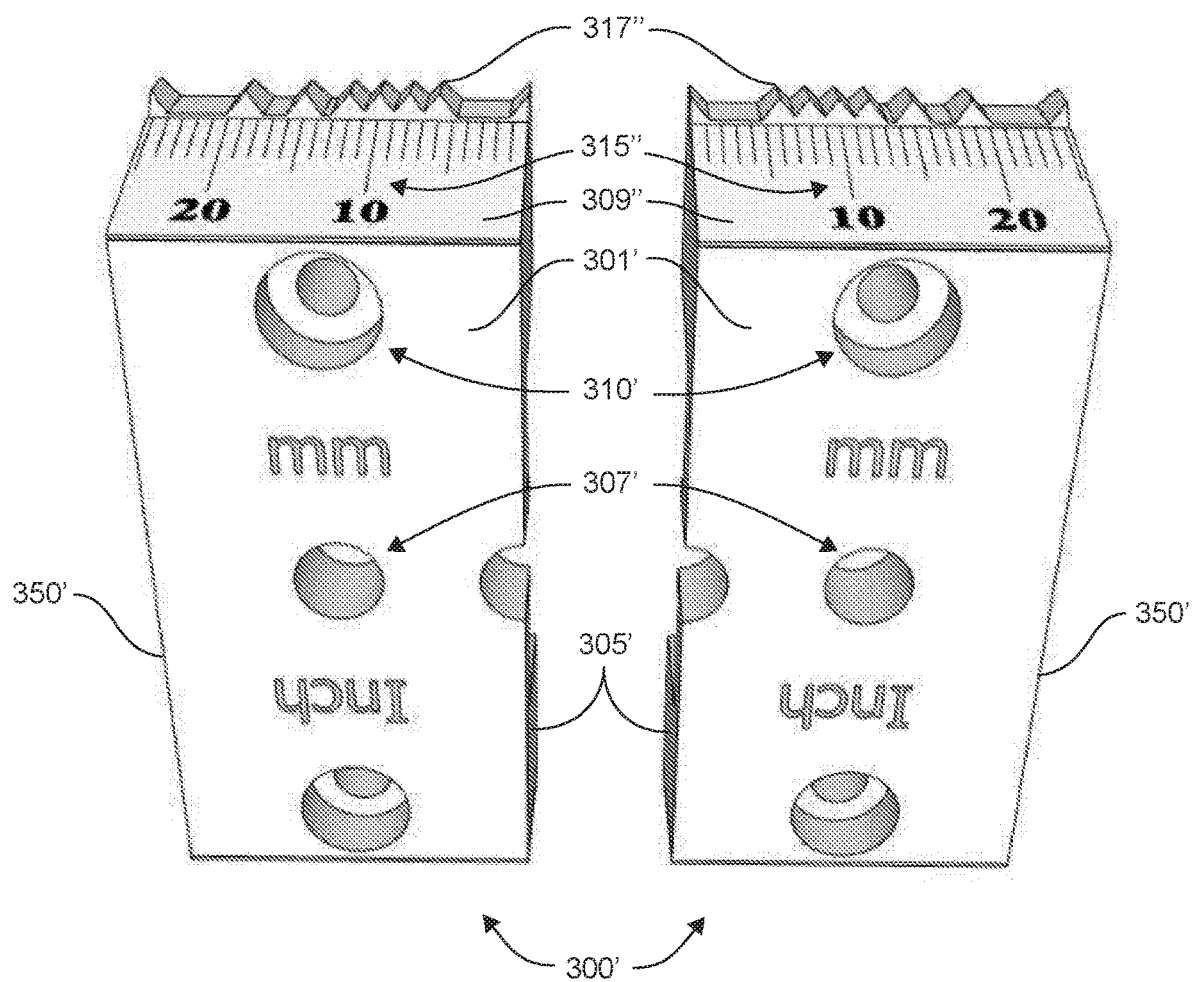
FIG. 20 is a top perspective view of a preferred alternative embodiment of a plurality of guide bearing stops of FIG. 14 showing the metric cutting bit size indicia oriented near the top of the stops in an orientation that may be used to align the metric cutting bit size indicia with upper measurement indicia on a template holder.
Figure 21:
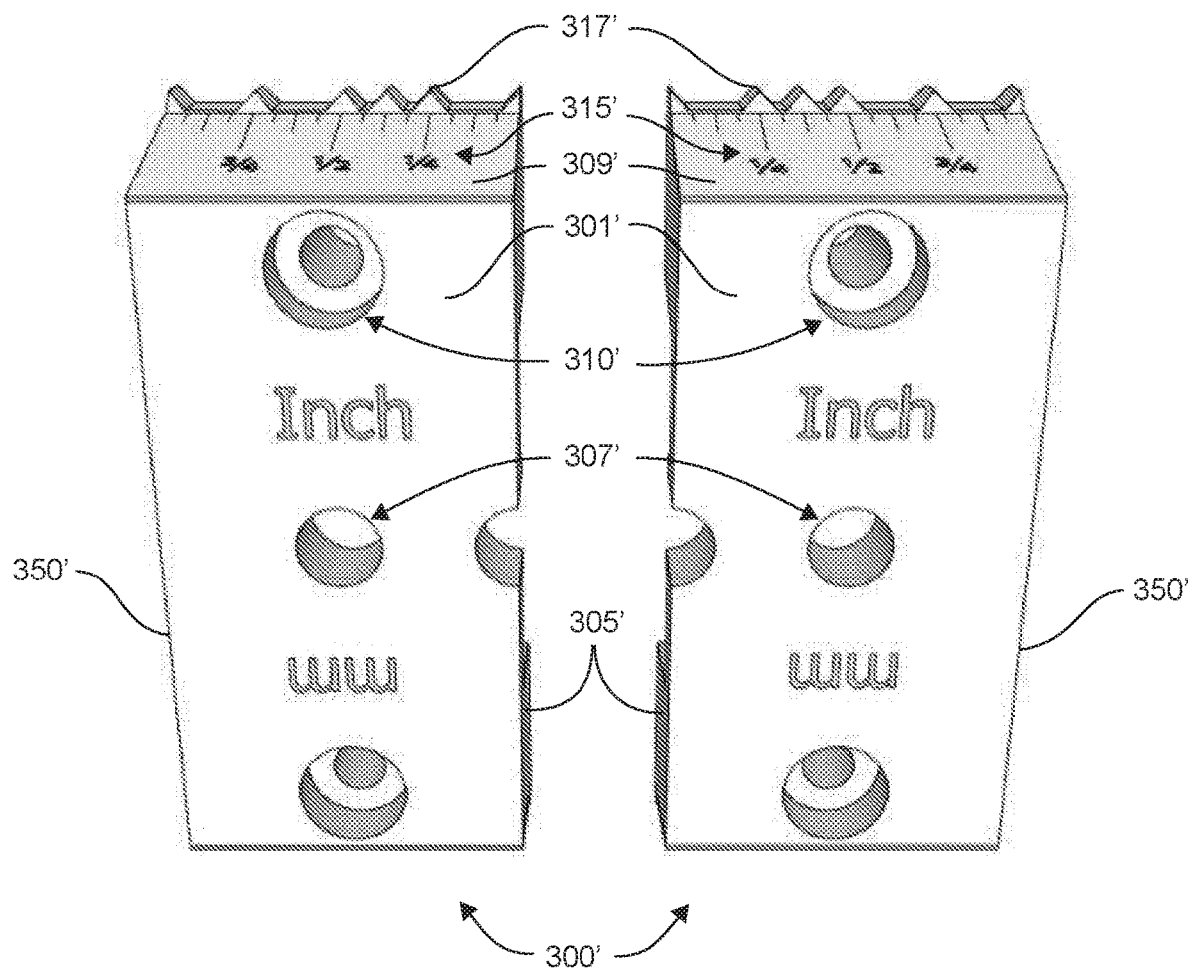
Figure 22A:
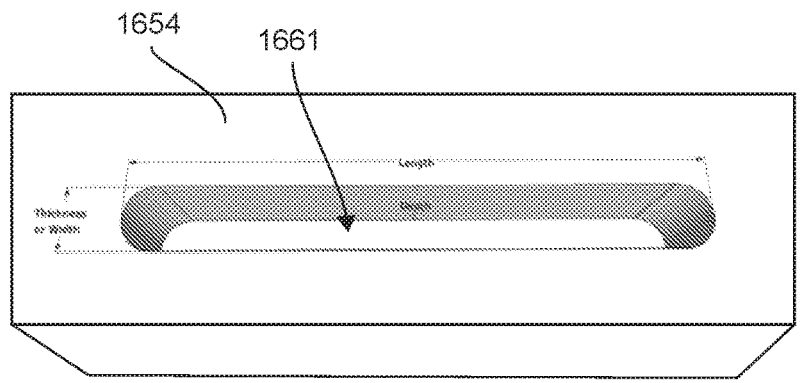
Figure 22B:
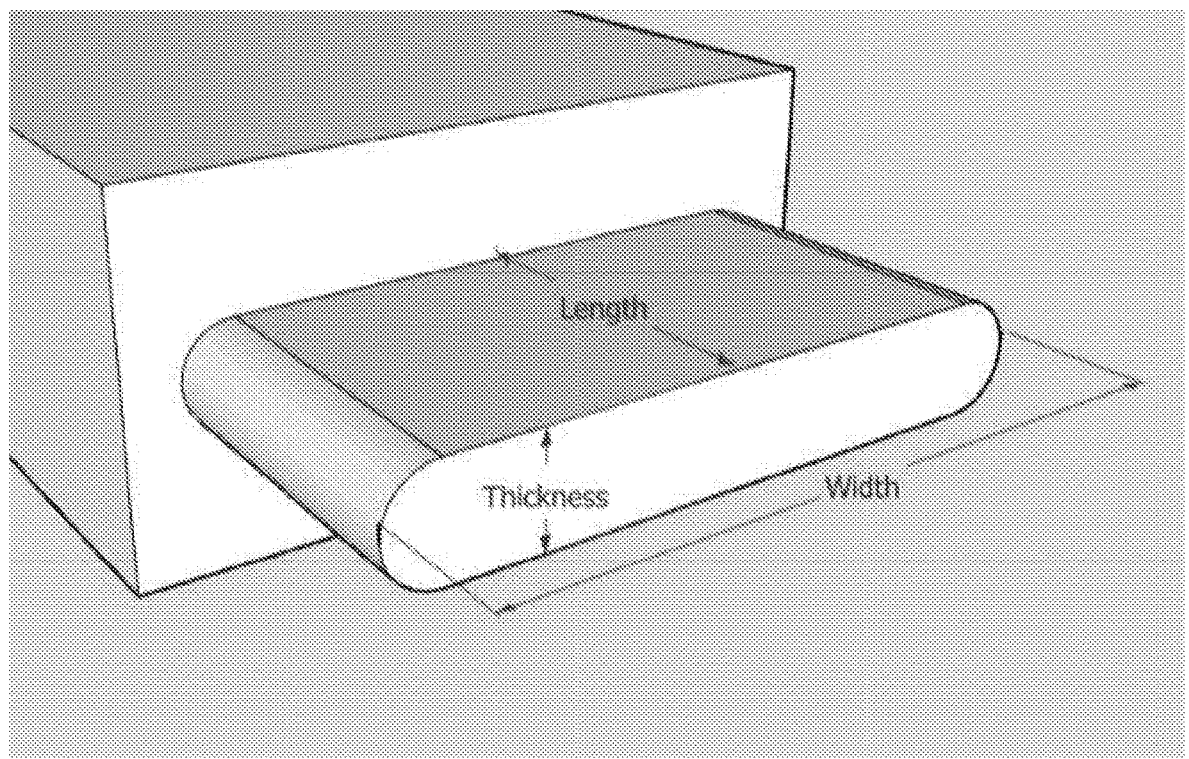

FIG. 21 is a top perspective view of the embodiment of a plurality of guide bearing stops of FIG. 14 with the stops having been rotated 180° degrees relative to FIG. 20 (though still labeled as a top view to orient them relative to a template holder 1622) and showing the standard (inches) cutting bit size indicia oriented near the top of the stops in an orientation that may be used to align the standard cutting bit size indicia with upper measurement indicia on the template holder as the stops have been rotated;

FIG. 22A is a sample mortise with a descriptive legend for orienting a typical mortise in a workpiece for helping identify the mortise length, width/thickness, and depth as those terms are used herein and commonly in the industry; and FIG. 22B is a sample tenon with a descriptive legend for orienting a typical tenon on a workpiece for helping identify the tenon width, thickness, and length as those terms are commonly used in the industry.

DETAILED DESCRIPTION

A PantoRouter™ (a pantograph-type router system) is advantageous over the prior art, since the aforementioned imperfections in a template or guide stop are minimized by a reduction in scale of cutting movements, and hence such a system enables a cleaner and more precise cut. The devices, systems, and methods (collectively these may be referred to as the invention), shown, described, and claimed herein address the problems of prior art router template systems, and the invention contributes to a more accurate, efficient, repeatable, pleasing appearance, a faster cut on a workpiece, and a safer operating environment for operators. Present embodiments are preferably used with a pantographic-type router mount with a 2:1 mechanical advantage for the router, and this mechanical advantage gives the operator control and precision superior to any other manually controlled means of operation.

Figure 1A:
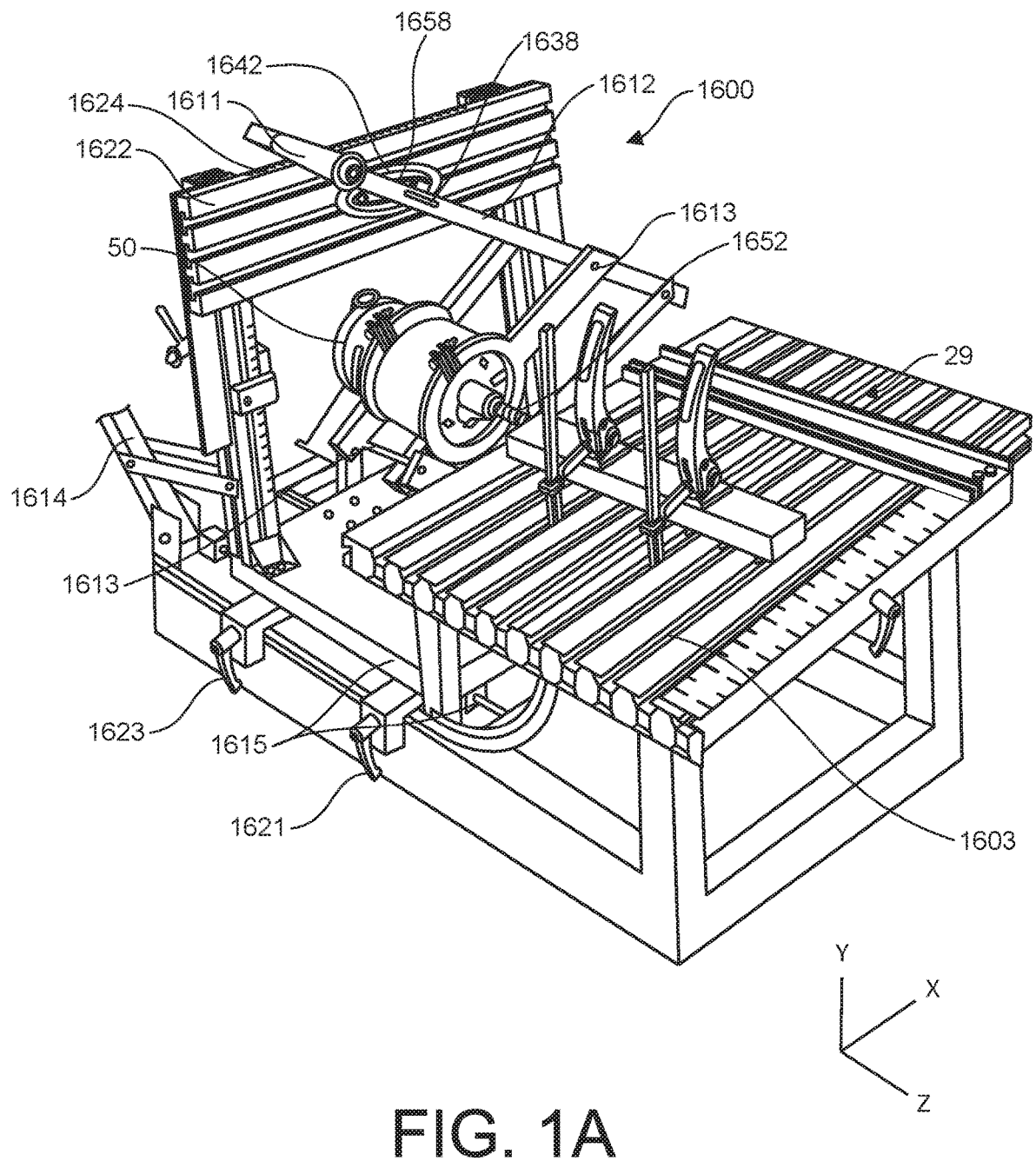
FIG. 1A is a perspective view of a pantograph-type router system, with which present embodiments of the disclosure are intended to be used.
Figure 1B:
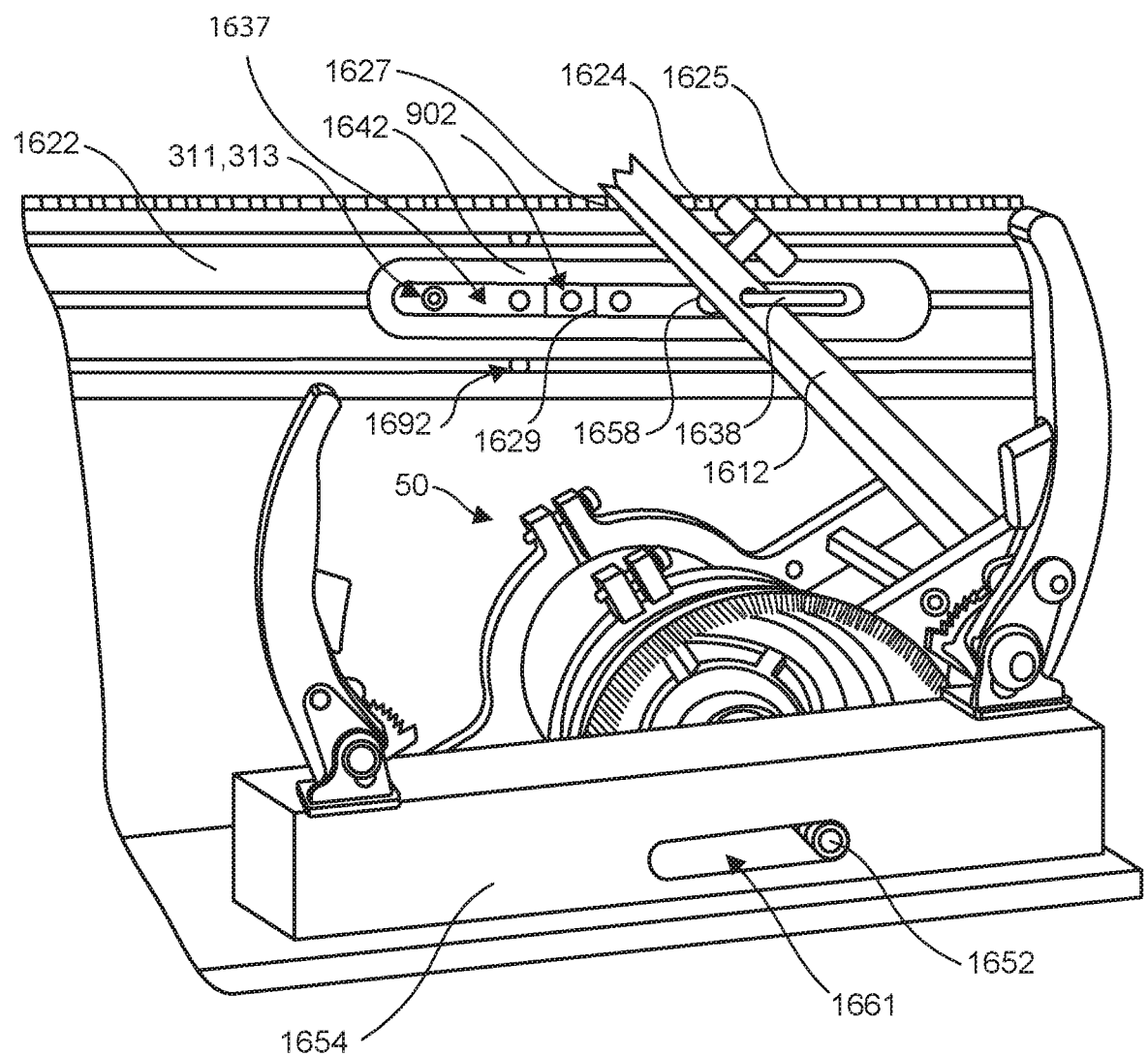
FIG. 1B is a perspective close-up view of part of a pantograph-type router system making a mortise cut on a workpiece.
Figure 13:
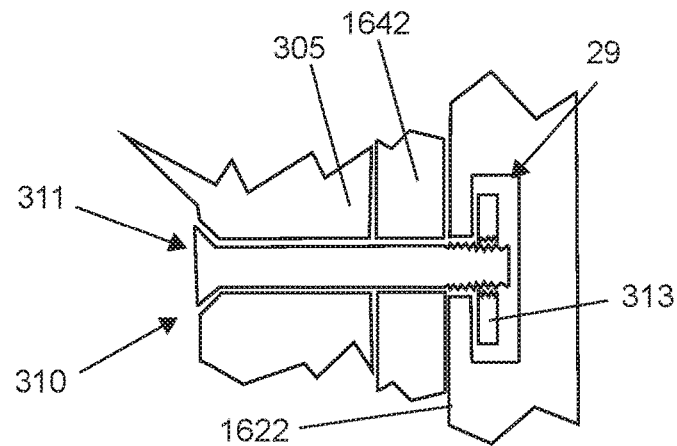
FIG. 13 is a cross section view taken along lines 13-13 of FIG. 12 of a threaded key attachment mechanism adapted for releasably interconnecting a stop with a template holder.

Referring to FIGS. 1A and 1B, a known pantograph-type router system 1600, which may be used with present embodiments, is shown. The system 1600 generally provides a router 50 on a frame with an arm 1612 and handle 1611 for moving the router about pivot pins 1613 in an x-axis direction and a y-axis direction (as referenced on FIG. 1A), and another handle (a plunge handle) 1614 for controlling movement of the router in a z-axis direction on a carriage system 1615. The system 1600 further comprises a template holder 1622 for holding a template 1642 with means of a releasable and adjustable key having a threaded screw and key similar to the screw 311 and key 313 shown in FIG. 13 for holding a stop 200, 300, 300' to a template holder 1622.

As shown in FIG. 1A, a guide bearing 1658 is carried on a guide bearing shaft 1638 in a position for cutting a tenon on the template 1642. There is a cutting bit 1652, a workpiece cutting table 1603, plunge stops 1621 and 1623, and other centering devices and systems as set forth in U.S. patent application Ser. No. 16/813,460 for Positioning and Centering Device, System, and Method for Use with a Template Guidance System for a Pantograph Router, for minimizing the time necessary to setup new cutting projects. In FIG. 1B, there is a guide bearing 1658 shown in a mortise cutting slot or track 1637 within a template 1642 as is a typical location for a guide bearing for cutting a mortise 1661 in a workpiece 1654 with a cutting bit 1652. On an upper surface 1624 of the template holder 1622 there are measurement indicia 1625 and a centering line or indicia, such as an arrow, 1627 within view of the template. The router guide template 1642 is utilized on the template holder 1622 to direct the router guide bearing 1658, which in turn will direct the cutting bit 1652 to cut on the work piece 1654.

Figure 2:
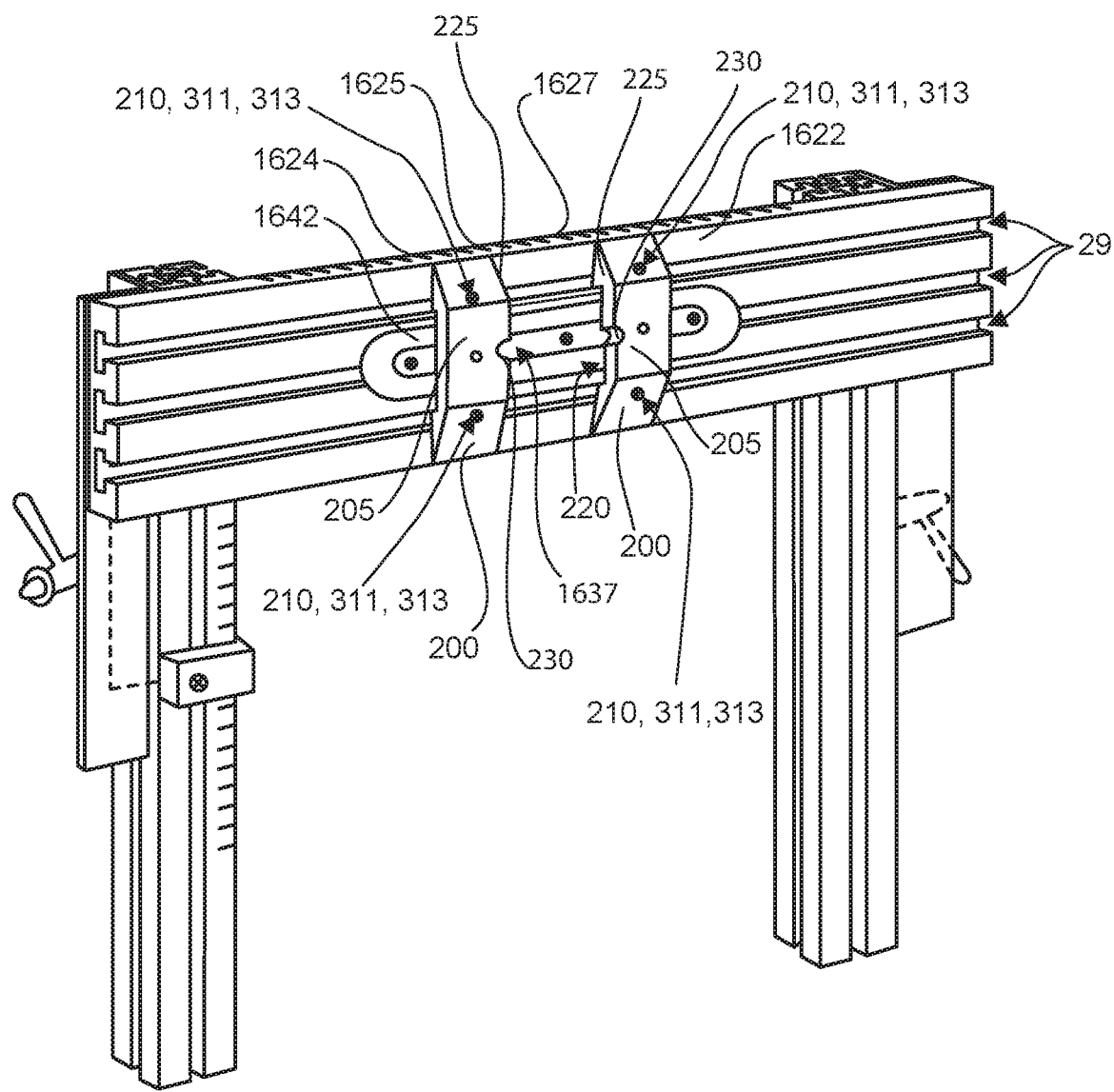
FIG. 2 is a perspective view of a guide bearing stop system, comprising a plurality of guide bearing stops in accordance with one or more aspects and present embodiments of the disclosure and attached to a template holder.
Figure 3:
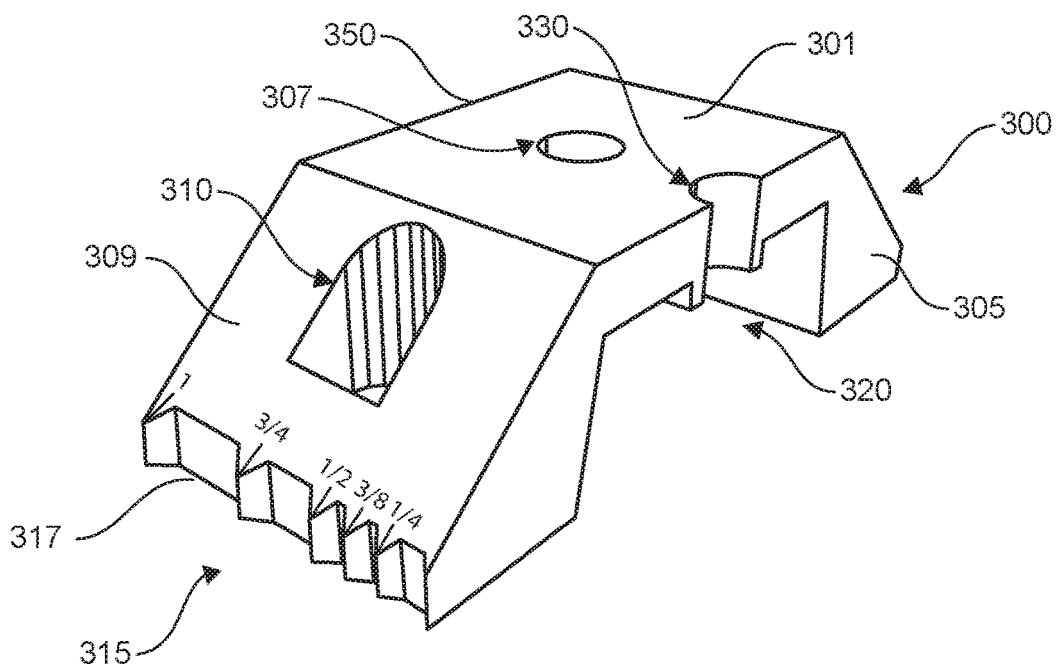
FIG. 3 is a perspective view of a guide bearing stop in accordance with one or more aspects and an embodiment of the disclosure.
Figure 4:
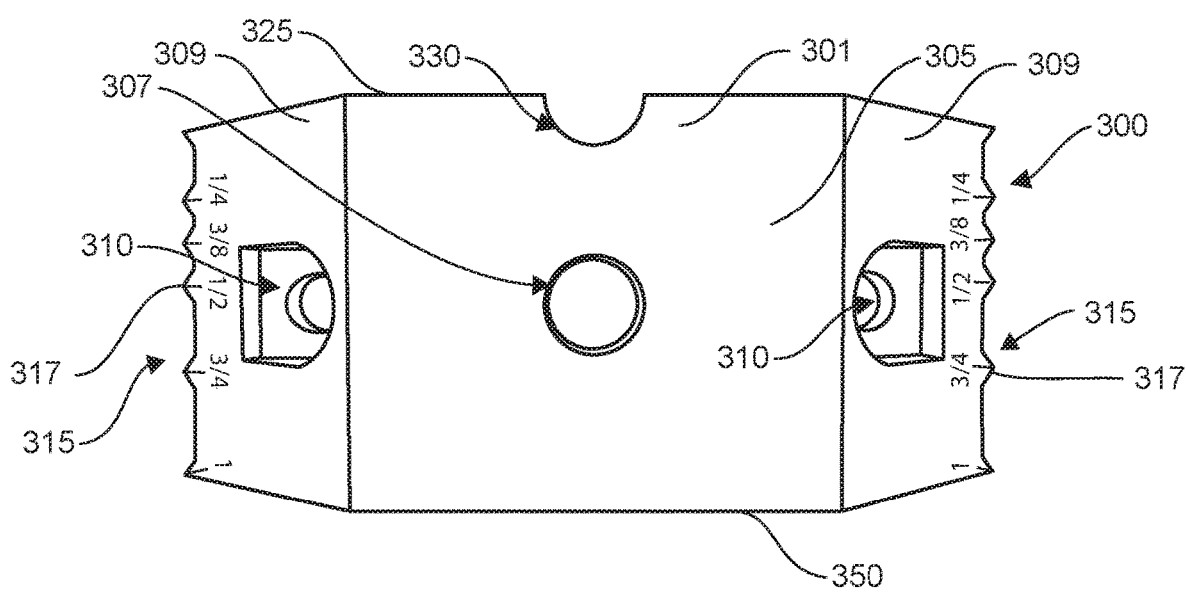
FIG. 4 is a top view of a guide bearing stop in accordance with one or more aspects and an embodiment of the disclosure.
Figure 5:
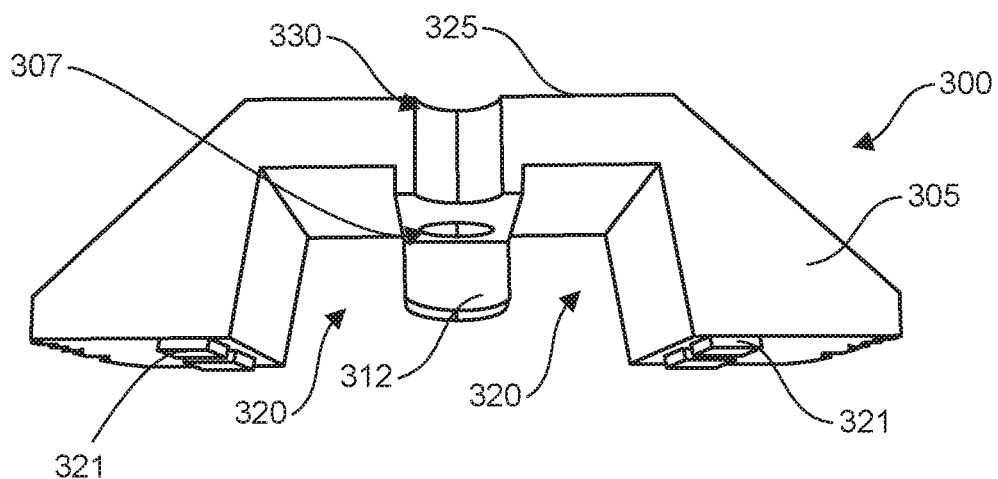
FIG. 5 is an upward perspective view of a guide bearing stop in accordance with one or more aspects and an embodiment of the disclosure.
Figure 6:
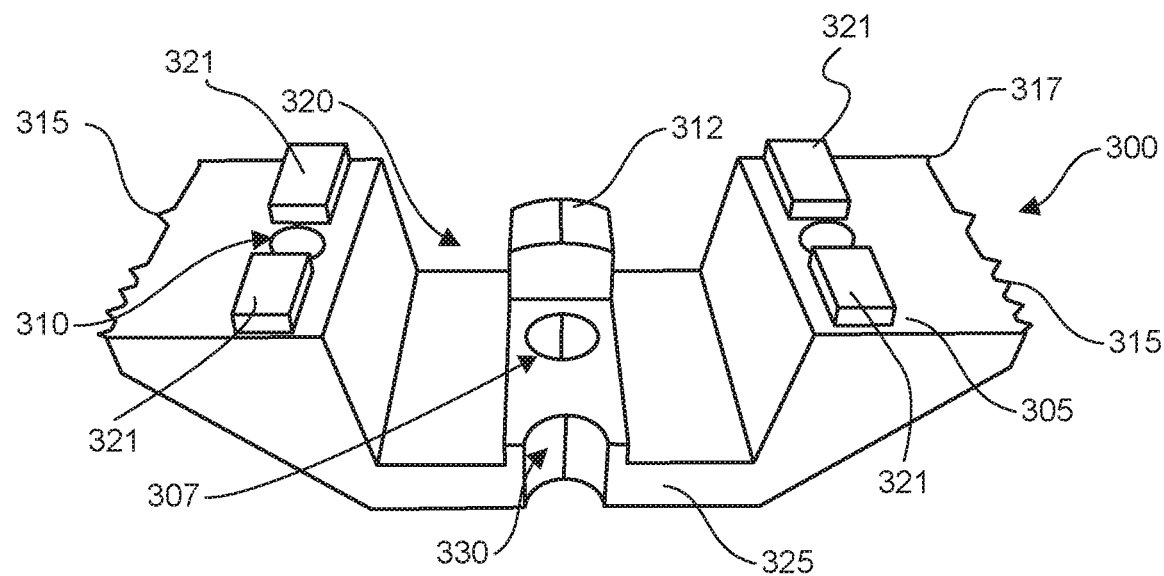
FIG. 6 is an upside-down perspective view of a guide bearing stop in accordance with one or more aspects and an embodiment of the disclosure.

Referring to FIG. 2, in accordance with one or more aspects and embodiments of the disclosure, there are provided basic guide bearing stops 200, adapted for adjustable attachment adjacent the template 1642 on the template holder 1622. Preferably, the guide bearing stops 200 may be placed on top of the template 1642 in order to stop travel of the router guide bearing 1658 to limit the extend of the resulting mortise cut 1661.

Each guide bearing stop 200 comprises a frame member 205 comprising a stop portion 230 and an inner stop edge 225 adapted for limiting travel of the guide bearing according to a desired extent of cut of a mortise 1661. The frame member 205 defines at least one hole 210, but preferably two holes 210, each adapted for receiving a releasable fastener, such as a threaded key system for engaging tracks 29 on the template holder 1622, for adjustably fastening the stop 200 to at least one of (or alternatively both) the template holder and the template 1642. Each stop 200 may either include cutting bit indicia on the stop (e.g., as further described below in connection with stops 300), or other means may be provided for aligning the stops 200 with a template 1642 or template holder 1622 to help align the stops for purposes of determining their position on the template holder or template given a chosen cutting bit size and desired mortise length in the X direction as per the legends in FIGS. 1A and 22.

Figure 9:
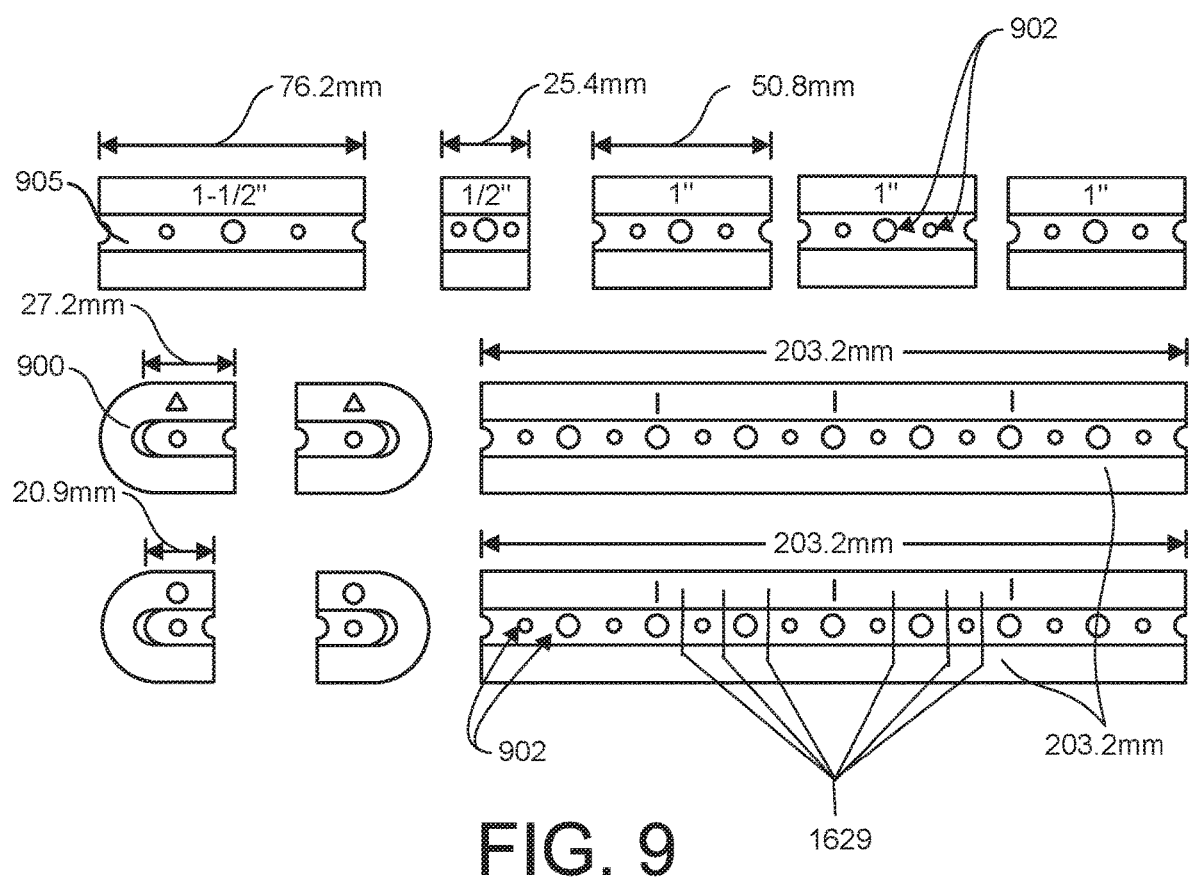
FIG. 9 is a plan view of segmented router guide template segments which may be mixed and matched to achieve different length templates for cutting varied-length mortise and tenon joinery and which are compatible with guide bearing stops and systems of present embodiments.

Thus, for example, there may be provided another hole 207 in each stop frame 205 either for enabling fastening the stop 200 to the template 1642 itself, for assistance in aligning the stop using a pin (not shown) relative to predetermined positioned holes 902 of a template (e.g., template 900 of FIG. 9), index lines 1629 of a template (e.g., index lines 1629 of FIG. 9), or holes 1692 of a template holder 1622 (e.g., template 1622 shown in FIG. 1B), or for assistance with aligning the stop relative to indicia on the template or template holder (not shown) as will be appreciated by those skilled in the art and in view of this disclosure. Thus, such holes 1692 may correspond with predetermined cutting bit diameters with which to align the stop 200, and positioning of the stop 200 may be accomplished by aligning with holes 1692 in the template or in the template holder in order to determine locations of the stop for a desired cutting bit diameter to achieve a desired length of mortise in the X direction per the legends of FIGS. 1A and 22. And such a system may be in lieu of the alternative, and preferred method of aligning stops as set forth hereinafter relating to stops 300 of FIGS. 3-6 or stops 300' of FIGS. 14-21, and wherein in either case the stop portion 205 of the stop 200 is associated with and able to be aligned by alignment means for allowing easy determination of a desired location of the stop on the template 1642 and/or template holder 1622, such as providing an inner edge portion 225 (or inner edges 325, 325' of stops 300, 300' respectively) relative to measuring indicia 1625, 1627 of the template holder 1642, and/or indicia on the template itself (e.g., index lines 1629 of FIG. 9), so as to be adapted to limit travel of the cutting bit 1652 while the guide bearing 1658 is being manipulated along the template 1642 up to the stop portion 230 according to a user selected cutting bit size (e.g., as with a certain type of template selected, or as per placement of index lines 1629 having been pre-determined to accommodate a certain cutting bit size) and a desired mortise 1661 cut extent.

The frame member 205 may be arched so as to be adapted for attachment to the template holder 1622 over the template 1642, and the frame member may contain one, or a plurality, of interior slots, or voids, 220 adapted for being positioned adjacent portions of the template such that the stop 200 straddles portions of the template 1642 as shown.

The plurality of interior slots 220 may be adapted to fit on top of any of a number of different templates 1642. Further, the frame member 205 may define a plurality of holes 210 adapted for receiving releasable fasteners (e.g., like fasteners 311, 313 of FIG. 13) for adjustably fastening the stop 200 to at least one of the template holder 1622 and the template 1642. Such fasteners preferably comprise threaded key locks (e.g., like threaded key locks 311, 313 of FIG. 13) adapted for engaging at a rear portion key 313 with any of slots 29 of the template holder 1622.

Each stop 200 is used in setting a limit of travel of the guide bearing 1658 in at least one direction (but preferably in at least two directions) of engagement along the template 1642 to limit the travel of the cutting bit 1652 relative to a workpiece 1654, and to allow for highly exact and consistent mortise cuts 1661 to be produced using the pantograph router system 1600.

Referring now further specifically to FIGS. 3-6, there is provided an alternative guide bearing stop 300 in accordance with one or more aspects of the disclosure and an embodiment to produce a mortise cut 1661 of exact size and shape. The guide bearing stops 200 of FIG. 2, and the guide bearing stops 300 of FIGS. 3-6, are the same, except guide bearing stops 300 have additional features as further described below. Each guide bearing stop 300 comprises a frame member 305 comprising a top portion 301, angled side portions 309, a stop portion 330, and an inner stop edge 325 adapted for limiting travel of the guide bearing according to a desired extent of cut of a mortise 1661. The frame member 305 defines at least one hole 310 (preferably a hole 310 is defined in each angled side portion 309) adapted for receiving a releasable fastener, such as a threaded key system 311, 313 (see FIG. 13), comprising a screw 311 and key member 313, for engaging tracks 29 on the template holder 1622 as is known in the art of releasably attaching templates and the like to such slots 29, for adjustably fastening the stop 300 (or 200 of FIG. 2) to one of the template holder and the template 1642. Another hole 307 may be provided either for enabling fastening the stop 300 to the template 1642 itself, or for assistance in aligning the stop with the template (e.g., as described in connection with alignment hole 207 and FIGS. 2 and 9).

In a preferred embodiment, however, the frame member 305 further comprises cutting bit-related indicia 315 thereon adapted for enabling accurate positioning of the stop portion 330 of the frame member relative to the measuring indicia 1625, 1627 of the template holder 1642 adapted to limit travel of the cutting bit 1652 while the guide bearing is being manipulated along the template 1642 up to the stop portion 330 according to a user selected cutting bit size and desired mortise 1661 cut extent.

The frame member 305 may be arched so as to be adapted for attachment to the template holder 1622 over the template 1642, and the frame member may contain one or a plurality of interior slots, or voids, 320 adapted for being positioned adjacent portions of the template such that the stop 300 straddles portions of the template 1642 as shown.

The plurality of interior slots 320 may be adapted to fit on top of any of a number of different templates 1642. Optionally, there may be a smaller arched prominence 312 which extends outwardly from a back end 350 of the stop 300 which fits within mortise slot area 1637 of the template 1642 to assist with positioning the stop on the template. Further, the frame member may define a plurality of holes 310 adapted for receiving releasable fasteners (e.g., 311, 313 of FIG. 13) for adjustably fastening the stop 300 to at least one of (or alternatively both) the template holder 1622 and the template 1642. Such fasteners preferably comprise threaded key locks 311, 313 adapted for engaging at a rear portion key with any of slots 29 of the template holder 1622.

The frame member comprises an inner stop edge 325 and a cutting bit-related indicia 315 edge normal to inner stop edge 325, and preferably the stop portion 330 of the frame member 305 comprises a semi-circular void defined at the stop portion on the inner stop edge 325. The cutting bit-related indicia 315 is useful for allowing the guide bearing stop 300 to be used with cutting bits 1652 of various sizes without requiring a different guide bearing stop for each different sized bit. The cutting bit-related indicia 315 may have a plurality of cutting bit sizes (e.g., 1, ¾, ½, ⅜, and ¼) having corresponding pointers 317 adapted for pointing to measurement locations along the measuring indicia 1625, 1627 on the template holder 1622, adapted for easily setting a position of the stop 300 according to a chosen cutting bit size and desired mortise 1661 cut extent.

The guide bearing stop 300 preferably comprises a stop portion 330 which halts the motion of the guide bearing shaft, or pin, 1638 along the inner stop edge 325, and may preferably be adapted for engaging the shaft 1638 of the guide bearing 1658 and wherein the frame member 305 defines a void(s) 320 allowing clearance of the guide bearing between the frame member 305 and the template 1642. To facilitate correspondence with a certain chosen bit size and location relative to the indicia 1625, 1627 of the template holder, the void at the stop portion 330 is preferably just deep enough to allow ½ the diameter of the shaft before the shaft hits the stop portion 330. In this way, it may be seen that, for example, the 1" cutting bit indicia 315 is aligned on the front edge 325 of the stop 300 such that the center of the guide bearing 1658, and hence the guide bearing shaft 1638, is to be positioned right at the front edge of the stop. Thus, as a reference, if a user wishes to use a 1" cutting bit to cut a 3" mortise, the user simply aligns the 1" designation with the 3" location on either side of the center indicia 1627 as measured using the measuring indicia 1625 to cut a 3"

mortise. Recall that this is so, since the template 1642 is twice the size of the desired mortise 1661 for a pantograph-type router system 1600. Thus, correspondingly, the center of the guide bearing 1658 and the cutting bit 1652 travel the correct distance to cut the correct size mortise 1661, and the distance of the indicia 315 on the stop 300 is calibrated the correct distance from the front edge 325 of the stop such that the user simply selects the proper cutting bit indicia size and simply aligns it with the desired measurement indicia size for the mortise cut extent to achieve the correctly-sized mortise cut, length-wise (that is in the x-axis direction as shown in FIGS. 1A and 22A). Note that per FIGS. 22A and 22B, this length of a mortise corresponds to the width of a tenon as these terms are used in the industry.

Thus, it will be appreciated that the user is greatly facilitated in changing the positioning of the stops 300 relative to a larger template 1642, according to the aforementioned indicia, so as to enable selection of any of a very large number of desired mortise length cut sizes while using a given cutting bit size. Thus, since the stop 300 may be adapted for quick and easy adjustment relative to a template 1642, this greatly enables accurate positioning and cutting of different sized mortises 1661 using the same template 1642.

Each stop 300 preferably comprises a plurality of alignment tenons 321 on a bottom surface of the frame 305 of the stop for insertion into slots 29 of the template holder 1622. These alignment tenons may be tapered in order to allow easier alignment of the stop with the slots 29 of the template holder 1622.

Referring now further specifically to FIGS. 14-19, there is provided an alternative embodiment guide bearing stop 300' in accordance with one or more aspects of the disclosure and an embodiment to produce a mortise cut 1661 of exact size and shape. The guide bearing stops 200 of FIG. 2, the guide bearing stops 300 of FIGS. 3-6, and the guide bearing stops 300', are similar, except that side member portions 309' and 309" of the frames 305' of guide bearing stops 300' have standard (inch-size) indicia 315' on a side 309', metric-sized indicia 315" on a side member portion 309", and the side member portions are steeper in their angle to allow for greater visibility of the cutting bit indicia thereon, and such that attachment holes 310' are not defined in the side member portions, but in a top portion 301' as further described below. Thus, each guide bearing stop 300' comprises a frame member 305' comprising a stop portion 330' and an inner stop edge 325' adapted for limiting travel of the guide bearing according to a desired extent of cut of a mortise 1661. The frame member 305' defines at least one hole 310' defined in the top portion 301' of the frame 305' and adapted for receiving a releasable fastener, such as a threaded key system 311, 313 (see FIG. 13), comprising a screw 311 and key member 313, for engaging tracks 29 on the template holder 1622 as is known in the art of releasably attaching templates and the like to such slots 29, for adjustably fastening the stop 300' to at least one of (or alternatively both) the template holder and the template 1642. Another hole 307' may be provided either for enabling fastening the stop 300' to the template 1642 itself, or for assistance in aligning the stop with the template (e.g., as described in connection with alignment holes 207 or 307—see FIGS. 2 and 9).

In a preferred embodiment, however, the frame member 305' further comprises cutting bit-related indicia 315' (standard inch-size indicia per FIGS. 17A and 19), 315" (metric indicia per FIGS. 17B and 18) on steeper side portions 309', 309" of frame 305' adapted for enabling easier viewing by a user and accurate positioning of the stop portion 330' of the frame member relative to the measuring indicia 1625, 1627 of the template holder 1642 adapted to limit travel of the cutting bit 1652 while the guide bearing is being manipulated along the template 1642 up to the stop portion 330' according to a user selected cutting bit size and desired mortise 1661 cut extent.

The frame member 305' may be arched so as to be adapted for attachment to the template holder 1622 over the template 1642, and the frame member may contain one or a plurality of interior slots, or voids, 320' adapted for being positioned adjacent portions of the template such that the stop 300' straddles portions of the template 1642 as shown.

The plurality of interior slots 320' may be adapted to fit on top of any of a number of different templates 1642. Optionally, there may be a smaller arched prominence 312' which extends outwardly from a back end 350' of the stop 300' which fits within mortise slot area 1637 of the template 1642 to assist with positioning the stop on the template. Further, the frame member 305' may define a plurality of holes 310' adapted for receiving releasable fasteners (e.g., 311, 313 of FIG. 13) for adjustably fastening the stop 300' to one of the template holder 1622 and the template 1642. Such fasteners preferably comprise threaded key locks 311, 313 adapted for engaging at a rear portion key 313 with any of slots 29 of the template holder 1622.

The frame member comprises an inner stop edge 325', and cutting bit-related indicia 315', 315" (for standard and metric-sized stops respectively) left and right side edges normal to inner stop edge 325', and preferably the stop portion 330' of the frame member 305' comprises a semi-circular void defined at the stop portion on the inner stop edge 325'. The cutting bit-related indicia 315', 315" is useful for allowing the guide bearing stop 300' to be used with cutting bits 1652 of various sizes without requiring a different guide bearing stop for each different sized bit. The cutting bit-related indicia 315' may have a plurality of cutting bit sizes (e.g., 1, ¾, ½, ⅜, and ¼, for standard-sized cutting bits) and the cutting bit-related indicia 315" may have a plurality of cutting bit sizes (e.g., 19, 15, 12, 10, 8, and 6, for metric-sized cutting bits), each having corresponding pointers 317' (left side—standard), 317" (right side—metric), respectively and depending on which side of the stop 300' is being used depending on whether a standard-sized or metric-sized cutting bit is being used, adapted for pointing to measurement locations along the measuring indicia 1625, 1627 on the template holder 1622, adapted for easily setting a position of the stop 300' according to a chosen cutting bit size and desired mortise 1661 length cut extent. The stops 300' may come in left and right pairs, and when standard-sized cutting bits are to be used, stops with standard-sized indicia 315' may be used, whereas when metric-sized cutting bits are to be used, stops with metric-sized indicia 315" may be used, or as shown in FIGS. 14-19, these standard and metric sizes may be located on either side of the same set of stops 300'. Thus, it will be appreciated that stops 300' with standard-sized indicia 315' on one side and metric-sized indicia 315" on another side (as shown in FIGS. 14-19) may be used, and the user simply rotates the pair of stops 300' by 180 degrees each time the user wants to use a different type of indicia to correspond to the upper measuring indicia 1625, 1627 on the template holder 1622.

The guide bearing stop 300' preferably comprises a stop portion 330' which halts the motion of the guide bearing shaft, or pin, 1638 along the inner stop edge 325', and may preferably be adapted for engaging the shaft 1638 of the guide bearing 1658 similar to that described above in connection with stops 200, 300, and wherein the frame member 305' defines a void(s) 320' allowing clearance of the guide bearing between the frame member 305' and the template 1642.

To facilitate correspondence with a certain chosen bit size and location relative to the indicia 1625, 1627 of the template holder, the void at the stop portion 330' is preferably just deep enough to allow ½ the diameter of the shaft 1638 before the shaft hits the stop portion 330'. In this way, it may be seen that, for example, the ¼" cutting bit indicia 315' is aligned on the front edge 325' of the stop 300' such that the center of the guide bearing 1658, and hence the guide bearing shaft 1638, is to be positioned right at the front edge of the stop. Thus, as a reference, if a user wishes to use a ¼" cutting bit to cut a 3" long mortise, the user simply aligns the ¼" designation with the 3" location on either side of the center indicia 1627 as measured using the measuring indicia 1625 to cut a 3" mortise. Recall that this is so, since the template 1642 is twice the size of the desired mortise 1661 for a pantograph-type router system 1600, and the smaller cutting bit would need to travel further along the template to accomplish the desired mortise length. Similar considerations apply when using a stop 300' having metric-sized cutting bit indicia 315" thereon. Thus, correspondingly, the center of the guide bearing 1658 and the cutting bit 1652 travel the correct distance to cut the correct size mortise 1661, and the distance of the indicia 315' with pointers 317' on the stop 300' (or indicia 315" with pointers 317" on a stop 300') is calibrated the correct distance from the front edge 325' of the stop such that the user simply selects the proper cutting bit indicia size and simply aligns it with the desired measurement indicia size for the mortise cut extent to achieve the correctly-sized mortise cut, lengthwise (that is in the x-axis direction).

Thus, it will be appreciated that the user is greatly facilitated in changing the positioning of the stops 300' relative to a larger template 1642, according to the aforementioned indicia, so as to enable selection of any of a very large number of desired mortise length cut sizes while using a given cutting bit size. Since the stop 300' may be adapted for quick and easy adjustment relative to a template 1642, this greatly enables accurate positioning and cutting of different sized mortises 1661 using the same template 1642.

Each stop 300' preferably comprises a plurality of alignment tenons 321' on a bottom surface of the frame 305' of the stop for insertion into slots 29 of the template holder 1622. These alignment tenons may be tapered in order to allow easier alignment of the stop with the slots 29 of the template holder 1622.

Figure 7:
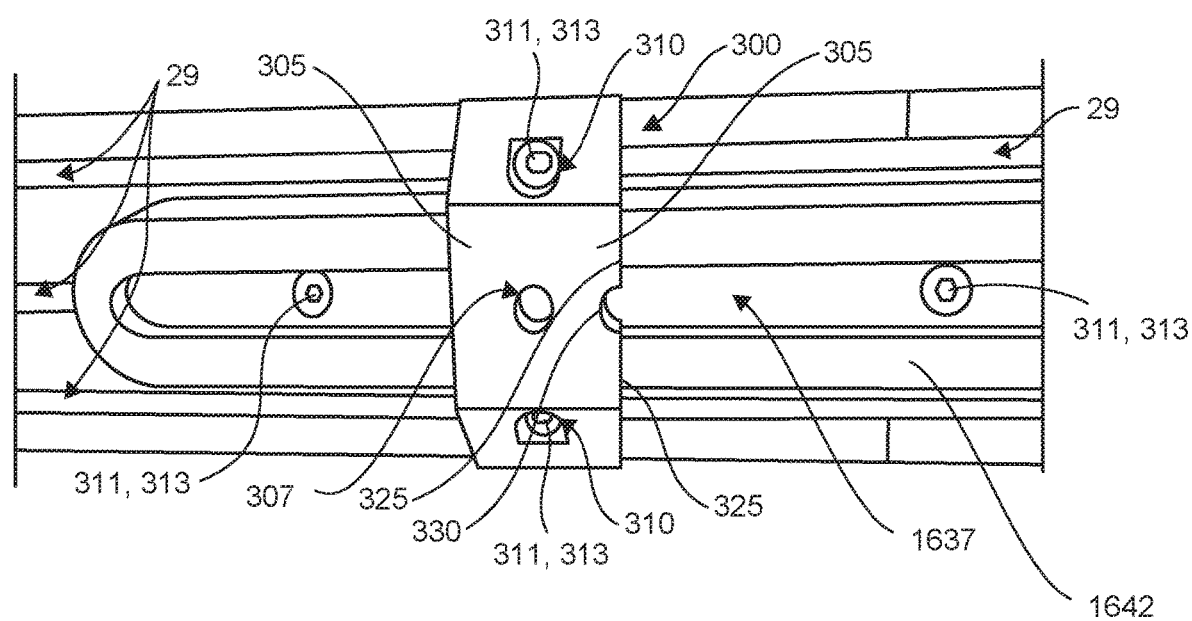
FIG. 7 is a top view of a guide bearing stop in accordance with one or more aspects and an embodiment of the disclosure and attached to template holder, wherein the stop straddles the template also attached to the template holder.
Figure 8:
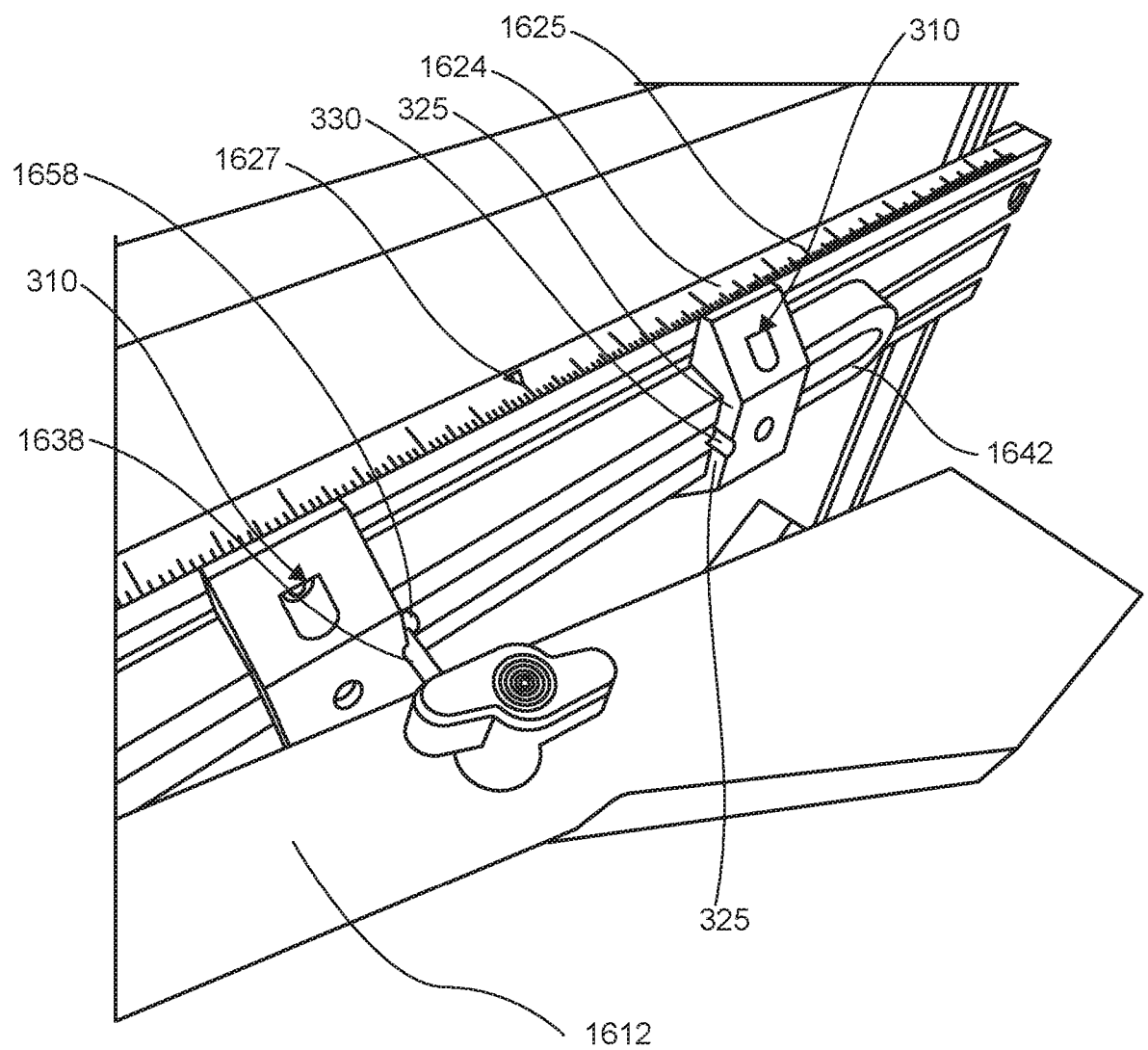
FIG. 8 is a downward-looking perspective view of a plurality of guide bearing stops, i.e., a system of guide bearing stops, in an accordance with an embodiment attached to a router guide template holder with the guide bearing stops straddling a template also attached to the template holder.

Referring now additionally to FIGS. 7-8, in accordance with an aspect of the disclosure, there may be a plurality of guide bearing stops 300 adapted for adjustable attachment adjacent a router guide template 1642 on a template holder 1622, the template holder having measuring and locating indicia 1625, 1627 thereon for gauging positioning of the template and stops for a pantograph-type router system 1600 having a guide bearing 1658 on a shaft 1638 and a cutting bit 1652, the stops 300 being adapted for use in setting a limit of travel of the guide bearing preferably in at least two directions of engagement along the template to limit the travel of the cutting bit relative to a workpiece 1654.

Thus, in accordance with an alternative embodiment with this aspect, there is provided a set of guide bearing stops 300 to produce mortise cuts of varied size and shape (depending upon positioning of the stops on the template holder 1622), each stop comprising: a frame member 305 having a stop portion 330 along an inner stop edge 325 adapted for limiting travel of the guide bearing 1658. Each frame member 305 defines at least one hole 310 adapted for receiving a releasable fastener 311, 313 (see FIG. 13) for adjustably fastening the stop 300 to one of the template holder 1622 and the router guide template 1642, wherein each frame member further comprises cutting bit-related indicia 315 thereon adapted for enabling accurate positioning of the stop portion 330 of each frame member relative to the measuring indicia of the template holder 1622 and adapted to limit travel of the cutting bit 1652 while the guide bearing 1658 is being manipulated along the template 1642 up to the stop portion 330 according to a user selected cutting bit size and desired cut extent. Each guide bearing stop 300 of the set may comprise all of the features and details set forth above which may be included with other embodiments of the disclosure.

Referring now additionally to FIGS. 20 and 21, in accordance with an aspect of the disclosure, there is provided a plurality of guide bearing stops 300' adapted for adjustable attachment adjacent a router guide template 1642 on a template holder 1622, the template holder having measuring and locating indicia 1625, 1627 thereon for gauging positioning of the template and stops for a pantograph-type router system 1600 having a guide bearing 1658 on a shaft 1638 and a cutting bit 1652, the stops 300' being adapted for use in setting a limit of travel of the guide bearing preferably in at least two directions of engagement along the template to limit the travel of the cutting bit relative to a workpiece 1654.

Thus, in accordance with an alternative embodiment with this aspect, there is provided a set of guide bearing stops 300' to produce mortise cuts of varied size and shape (depending upon positioning of the stops on the template holder 1622), each stop comprising: a frame member 305' having a stop portion 330' along an inner stop edge 325' adapted for limiting travel of the guide bearing 1658. Each frame member 305' defines at least one hole 310' adapted for receiving a releasable fastener 311, 313 (see FIG. 13) for adjustably fastening the stop 300' to at least one (or both) of the template holder 1622 and the router guide template 1642, wherein each frame member further comprises cutting bit-related indicia 315', 315" thereon adapted for enabling accurate positioning of the stop portion 330' of each frame member relative to the measuring indicia 1625, 1627 of the template holder 1622 and adapted to limit travel of the cutting bit 1652 while the guide bearing 1658 is being manipulated along the template 1642 up to the stop portion 330' according to a user-selected cutting bit size and desired cut extent. Each guide bearing stop 300' of the set may comprise all of the features and details set forth above which may be included with other embodiments of the disclosure. Further, it will be appreciated to use either the cutting bit indicia 315', or cutting bit indicia 315", the user would simply rotate the stops 180° degrees laterally to have the desired cutting bit indicia adjacent the measurement indicia 1625, 1627 of the template holder 1622.

Referring now to FIG. g, there are shown component, or segment, pieces 900, 905 of router guide templates which can be mixed and match to make templates of different sizes in order to accommodate mortise and tenon cuts of varying sizes. There is thus provided varying length center pieces 905, which can be selected from a number of different sizes (e.g. 1½", ½", 1", 203.2 mm, etc.) and end pieces 900, which form the rounded ends of the templates similar to, for example, that as shown in FIG. 2 after the segments are combined on a template holder 1622. The guide bearing stops 200, 300, 300' of present embodiments are adapted to straddle such router guide templates and to fit anywhere along the length of the templates to allow for mortise cuts 1661 of varying size to be produced without having to change the router guide template. This feature helps avoid an otherwise time consuming process, that of changing the position of templates and stops 200, 300, 300' along the position of the templates, which otherwise can be time consuming and problematic especially in higher-production environments, for example, or in classroom woodshop type settings.

Major advantages of present embodiments include their adaptability to a router system that is easily and efficiently centered. Further, the present embodiments allow for easy and efficient adjustment to the length of mortise cuts (i.e., their length in the x-axis direction relative to the router) without having to alter the tool or even the router template. Other important advantages include the ability to rapidly make very exact mortise cuts which are consistent in size and shape and which can be consistently be reproduced across various work pieces—whereas again such exactness and consistency may be maintained even when adapting adjustments of the stops 200, 300, 300' to varying lengths of mortise cuts 1661. This leads to a more efficient process which allows for the consistent production of high-quality wood furniture and other items.

The cutting bit-related indicia 315 (e.g., FIGS. 3-6), 315', 315" (e.g., FIGS. 14-19) on the guide bearing stops 300, 300', 300" (respectively) is listed in order relative to the increasing size of the cutting bit (i.e. the smaller bit sizes are closer to the center piece) because the smaller cutting bits 1652 must travel a greater distance along the workpiece 1654 in order to make a mortise cut 1661 of the same length. Having cutting bit-related indicia 315, 315', 315" on each guide bearing stop 300, 300', 300", respectively, is useful as it allows for a user to rapidly center the router system 1600 in preparing to make a mortise cut 1661 using the same guide bearing stop, regardless of what size cutting bit is being used in the router system 1600.

The guide bearing stops 200, 300, 300' may be manufactured by a variety of means known within the art including, molding, casting, or 3D printing, and they may be produced from a variety of materials known within the art such as plastic or aluminum.

Also provided, in accordance with an alternative aspect and embodiment of the disclosure, is a preferred method of setting adjustable stop locations for a cutting bit 1652 relative to a workpiece adapted for cutting differently-sized mortises 1661 using a template-guided pantograph-type router system 1600 having a cutting bit 1652, a guide bearing 1658, a template holder 1622 with measuring and locating indicia 1625, 1627 thereon, and a guide template 1642.

Figure 10:
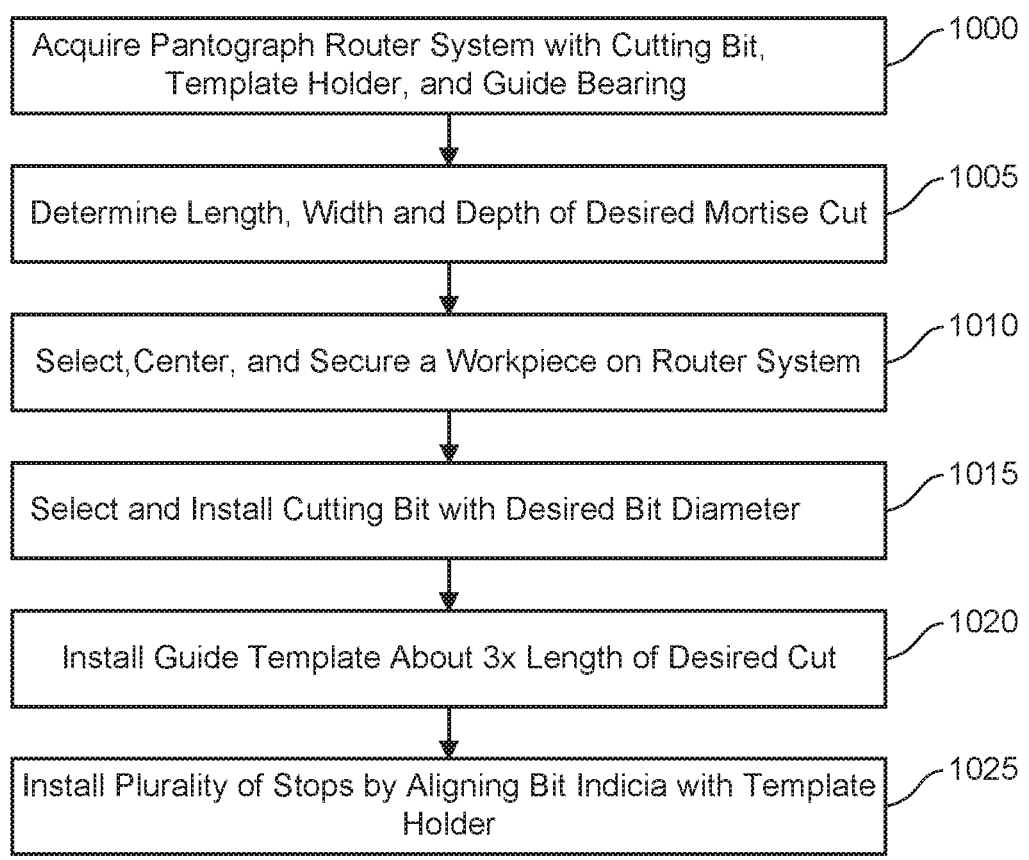
FIG. 10 is a process flow diagram for an improved method of setting up guide stops adapted for producing mortise cuts using the apparatus of present embodiments.

Referring now to FIG. 10, the method comprises the steps of: acquiring a pantograph-type router system with a cutting bit, template holder and guide bearing 1000; determining the length, width/thickness, and depth of the desired mortise cut 1005; selecting, centering, and securing a workpiece relative to the router system 1010; selecting and installing an appropriately-sized cutting bit to cut a desired thickness mortise 1015; selecting and installing a guide template having a mortise cutting portion that is approximately three times the length of a largest-length desired mortise cut and that corresponds to the desired thickness of the mortise 1020; and installing a plurality of stops by aligning bit size-related indicia on each of the stops with indicia on the template holder 1025, for enabling reducing of mortise length constraints by enabling stopping of the cutting bit 1652 according to a selected bit size and a desired mortise length shorter than the possible largest-length mortise for the chosen template.

Figure 11:
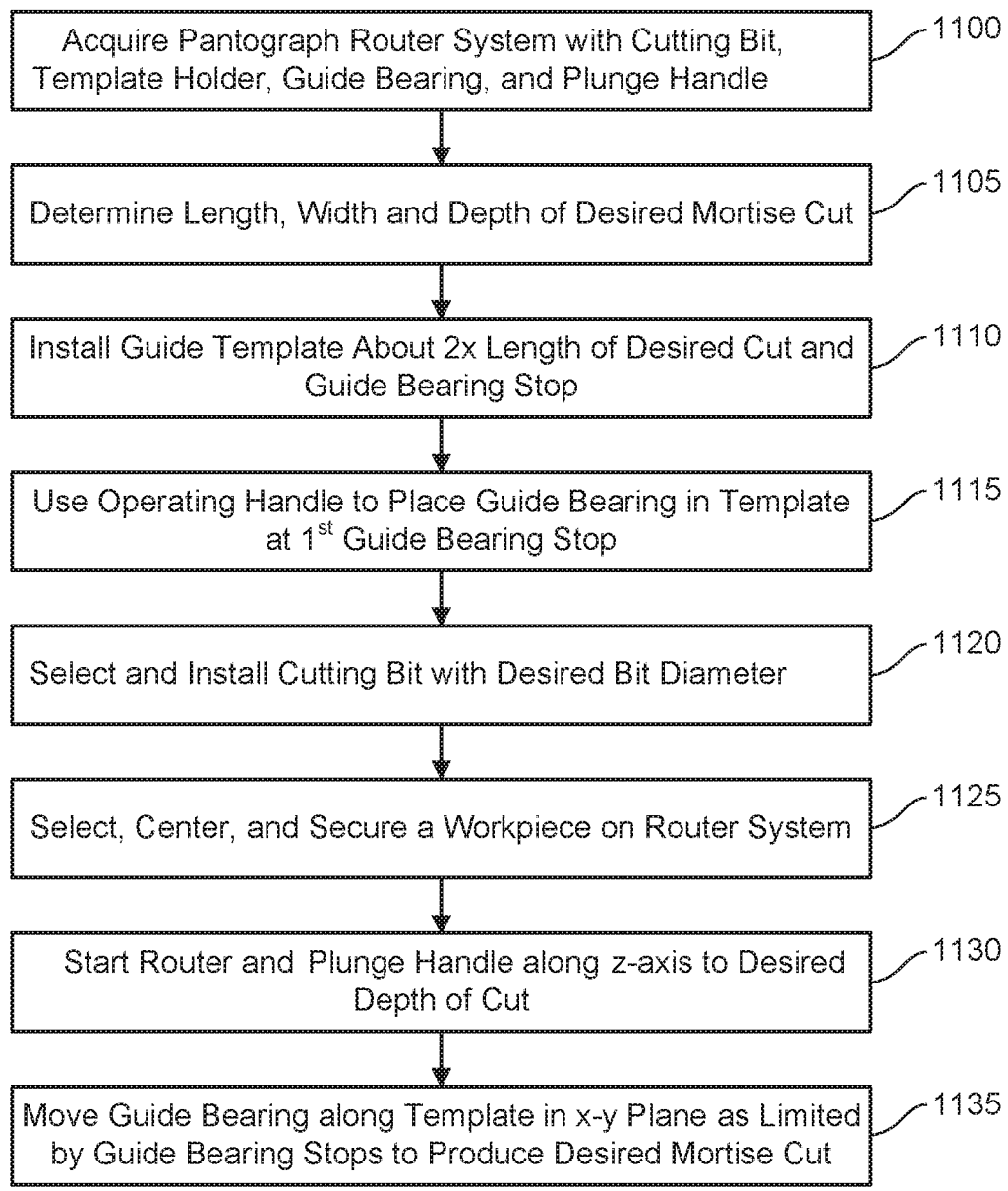
FIG. 11 is a process flow diagram for an improved method of producing mortise cuts using the apparatus of present embodiments.
Figure 12:
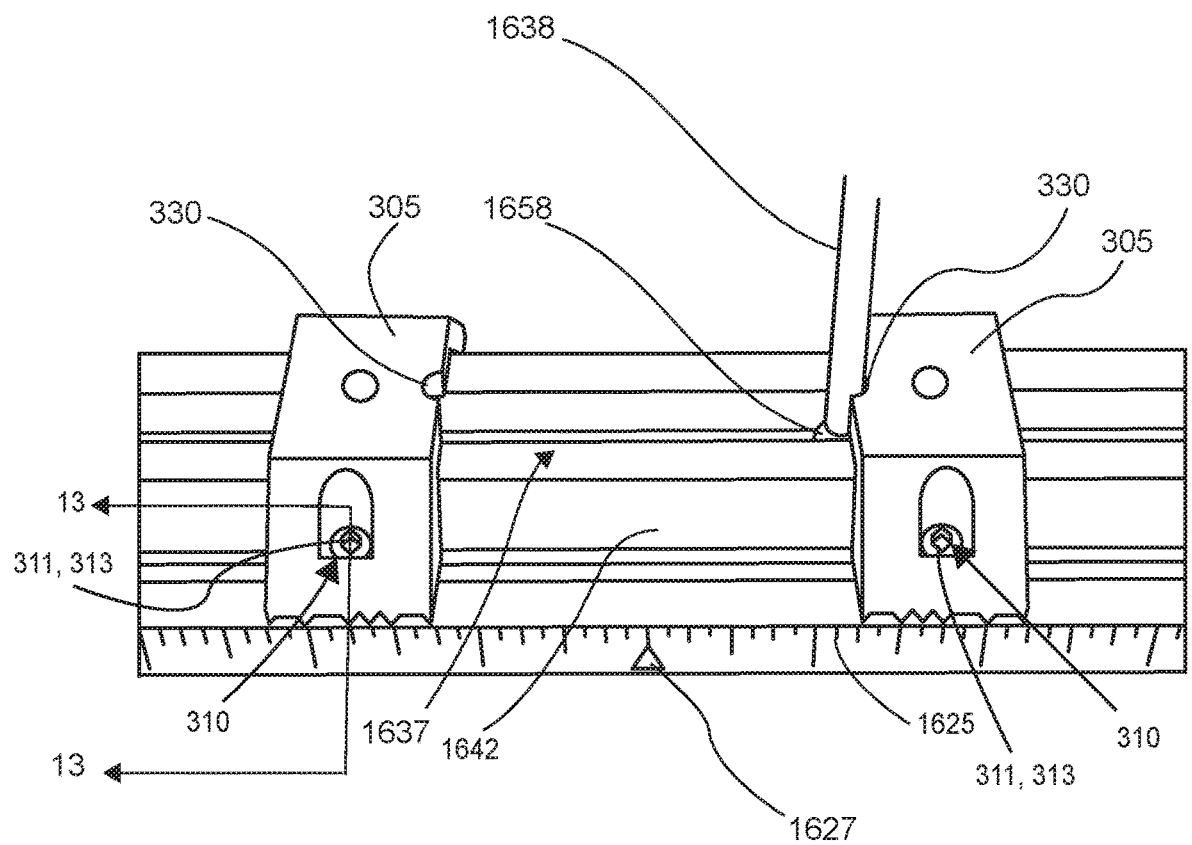
FIG. 12 is a top perspective view of a template holder, template, and guide bearing stops in accordance with one or more aspects of the disclosure and showing how a guide bearing is stopped within a template and a stop portion of a guide bearing stop.

Also in accordance with an aspect of this embodiment of the disclosure, the pantograph-type router may further comprise: a plunge handle 1614 for manipulating the router system 1600 in a z-axis direction relative to a workpiece, a z-axis depth stop 1621, 1623, and an operating handle 1612 for manipulating the guide bearing 1658 and the cutting bit 1652 in the x-axis and y-axis directions. Referring now to FIG. 11, the method may comprise the steps of: acquire a pantograph-type router with cutting bit 1652, template holder 1622, guide bearing 1658, and plunge handle 1614 per step 1100; determining a desired mortise depth and setting the corresponding z-axis plunge depth stop of the pantograph-type router 1105; install a guide template 1642 and guide bearing stop 200, 300, 300' about 2× the length of a desired mortise length cut per step 1110; using the operating handles 1611 and 1614 for placing the guide bearing 1658 within the template confines of mortise slot area 1637 for cutting the mortise 1661 per step 1115; selecting and installing a cutting bit with desired cutting bit diameter per step 1120; selecting, centering, and securing a workpiece on the router system per step 1125; starting the router system to operate the cutting bit and using the plunge handle for plunging the router system along the z-axis direction to the desired depth of the mortise cut per step 1130; and moving the guide bearing within the template confines along x-axis and y-axis directions and within the reduced mortise length constraints as limited by the plurality of stops per step 1135.

The foregoing methods and method steps greatly reduce the amount of time and effort required to cut on workpieces 1654, and in particular to cut mortise and tenon joints on a pantograph-type router system 1600, than those methods previously experienced. Further, the foregoing methods and method steps greatly reduce the amount of time and effort required to re-setup the pantograph-type router system 1600 to return to work that is similar to work performed previously. Thus, for example, in accordance with the aforementioned device, system, and methods, a user is enabled in quickly and precisely recreating similar cuts, and in particular mortise cuts of various sizes, since guide bearing stops 200, 300, 300' may be selected and positioned relative to the template 1642 and template holder 1622 to produce any of a number of desired size mortise cuts 1661, regardless of the length of a particular template 1642 chosen to cut the particular mortise, taking into account the type and diameter of cutting bit to be used. It should be noted in this process that different cutting bits from different manufacturers may have different characteristics.

Many modifications and other embodiments of the devices, systems, and methods set forth herein will come to mind to one skilled in the art to which this invention pertains and having the benefit of the teaching presented in the foregoing descriptions and the associated drawings. One of ordinary skill in the art will recognize the inventive principles disclosed are not limited to the embodiments disclosed herein, and that various aspects of the disclosed embodiments can be combined to achieve additional embodiments.

I claim:

1. A system for producing mortise cuts with a pantographic router having a guide bearing on a shaft for guiding a cutting bit on a workpiece, comprising:

a template holder adapted for use with the pantographic router;

a template adapted for releasable attachment to said template holder; and a guide bearing stop further comprising:

a frame member comprising a stop portion adapted for limiting travel of the guide bearing, said frame member defining at least one hole adapted for receiving a releasable fastener for adjustably fastening said stop portion to one of said template holder and said template, said frame member further comprising cutting bit-related indicia thereon adapted for enabling accurate positioning of said stop portion of said frame member relative to the measuring indicia of said template holder adapted to limit travel of the cutting bit while the guide bearing is being manipulated along said template up to said stop portion according to a user selected cutting bit size and desired cut to produce a desired sized mortise cut on the workpiece.

2. The system of claim 1, wherein said frame member is arched so as to be adapted for attachment to said template holder over said template.

3. The system of claim 1, wherein said frame member comprises a plurality of interior slots adapted for being positioned adjacent portions of said template such that said stop portion straddles portions of the template.

4. The system of claim 1, wherein said frame member defines a plurality of holes adapted for receiving releasable fasteners for adjustably fastening said stop portion to one of said template holder and said template.

5. The system of claim 3 wherein the plurality of interior slots is adapted to fit on top of said template.

6. The system of claim 1, wherein said frame member comprises an inner stop edge and a cutting bit-related indicia edge normal to said inner stop edge, and wherein said stop portion of said frame member comprises a semi-circular void defined on said inner stop edge.

7. The system of claim 6, wherein said cutting bit-related indicia comprises a plurality of cutting bit sizes having corresponding pointers adapted for pointing to measurement locations along said measuring indicia on said template holder, adapted for easily setting a position of said guide bearing stop according to a chosen cutting bit size and desired cut extent.

8. The system of claim 6, wherein said stop portion is adapted for engaging the shaft of the guide bearing and wherein said frame member defines a void allowing clearance of the guide bearing between said frame member and said template.

9. The system of claim 7, wherein said guide bearing stop is adapted for quick adjustment relative to said template to enable accurate positioning and cutting of different sized mortises using said template.

10. A system for producing mortise cuts with a pantographic router having a guide bearing on a shaft for guiding a cutting bit on a workpiece, comprising:

a template holder adapted for use with the pantographic router;

a template adapted for releasable attachment to said template holder; and a plurality of guide bearing stops adapted for adjustable attachment adjacent said template on said template holder, said template holder having measuring and locating indicia thereon for gauging positioning of said template, said plurality of guide bearing stops being adapted for use in setting limits of travel of the guide bearing in at least two directions of engagement along said template to limit the travel of the cutting bit relative to the workpiece, each guide bearing stop comprising:

a frame member comprising a stop portion adapted for limiting travel of the guide bearing;

each said frame member defining at least one hole adapted for receiving a releasable fastener for adjustably fastening said guide bearing stop to one of said template holder and said template;

each said frame member further comprising cutting bit-related indicia thereon adapted for enabling accurate positioning of said stop portion of said frame member relative to the measuring indicia of said template holder adapted to limit travel of the cutting bit while the guide bearing is being manipulated along said template up to said stop portion according to a user selected cutting bit size and desired cut extent.

11. The system of claim 10, wherein each said frame member is arched so as to be adapted for attachment to the template holder over a template.

12. The system of claim 10, wherein each said frame member comprises a plurality of interior slots adapted being positioned adjacent portions of the template such that the stops straddle portions of the template.

13. The system of claim 10, wherein each said frame member defines a plurality of holes adapted for receiving releasable fasteners for adjustably fastening the stops to one of the template holder and the template.

14. The system of claim 12, wherein the plurality of interior slots of each said frame member are adapted to fit on top of the template.

15. The system of claim 10, wherein each said frame member comprises an inner stop edge and a cutting bit-related indicia edge normal to said inner stop edge, and wherein said stop portion of each said frame member comprises a semi-circular void defined on said inner stop edge.

16. The system of claim 15, wherein the cutting bit-related indicia on each said frame member comprises a plurality of cutting bit sizes having corresponding pointers adapted for pointing to measurement locations along the measuring indicia on said template holder, each cutting bit-related indicia being adapted for easily setting a position of said guide bearing stop according to a chosen cutting bit size and desired cut extent.

17. The system of claim 15, wherein said stop portion of each said frame member is adapted for engaging the shaft of the guide bearing and wherein each said frame member defines a void allowing clearance of the guide bearing between the frame member and the template.

18. The system of claim 16, wherein each of said plurality of guide bearing stops is adapted for quick adjustment relative to said template to enable accurate positioning and cutting of different sized mortises using said template.

19. A method of setting adjustable stop locations for a cutting bit relative to a workpiece adapted for cutting differently-sized mortises using a template-guided pantograph-type router system having a cutting bit, a guide bearing, a template holder with measuring and locating indicia thereon, and a guide template, comprising the steps of:

determining the length, width/thickness, and depth of the desired mortise cut;

selecting, centering, and securing a workpiece relative to the router system;

selecting and installing an appropriately-sized cutting bit to cut a desired thickness mortise;

selecting and installing a guide template having a mortise cutting portion that is approximately twice the length of a largest-length desired mortise cut and that corresponds to the desired thickness of the mortise; and installing a plurality of stops by aligning bit size-related indicia on each of the stops with indicia on the template holder template for enabling reducing of mortise length constraints by enabling stopping of the cutting bit according to the selected bit size and a desired mortise length shorter than the possible largest-length mortise for the chosen template.

20. The method of claim 19, wherein the pantograph-type router further comprises a plunge handle for manipulating the router system in a z-axis direction relative to a workpiece, a z-axis depth stop, and an operating handle for manipulating the guide bearing and the cutting bit in the x-axis and y-axis directions, further comprising the steps:

determining a desired mortise depth and setting the corresponding z-axis plunge depth stop of the pantograph-type router;

using the operating handle for placing the guide bearing within template confines for cutting the mortise;

starting the router system to operate the cutting bit;

using the plunge handle for plunging the router system along the z-axis direction to the desired depth of the mortise cut; and moving the guide bit within the template confines along x-axis and y-axis directions and within the reduced mortise length constraints as limited by the plurality of stops.

* * * * *